(12) United States Patent
Takeda et al.

(10) Patent No.: US 10,645,374 B2
(45) Date of Patent: May 5, 2020

(54) HEAD-MOUNTED DISPLAY DEVICE AND DISPLAY CONTROL METHOD FOR HEAD-MOUNTED DISPLAY DEVICE

(71) Applicant: SEIKO EPSON CORPORATION, Tokyo (JP)

(72) Inventors: Takashi Takeda, Suwa (JP); Masayuki Takagi, Matsumoto (JP); Toshiaki Miyao, Matsumoto (JP); Akira Komatsu, Tatsuno-machi (JP); Takahiro Totani, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 397 days.

(21) Appl. No.: 15/433,139

(22) Filed: Feb. 15, 2017

(65) Prior Publication Data
US 2017/0257620 A1  Sep. 7, 2017

(30) Foreign Application Priority Data

Mar. 4, 2016 (JP) .................. 2016-041860
Sep. 30, 2016 (JP) .................. 2016-192987

(51) Int. Cl.
| | |
|---|---|
| *H04N 13/344* | (2018.01) |
| *G02B 27/01* | (2006.01) |
| *H04N 13/383* | (2018.01) |
| *H04N 13/398* | (2018.01) |
| *H04N 13/139* | (2018.01) |
| *G09G 5/10* | (2006.01) |

(52) U.S. Cl.
CPC ......... *H04N 13/344* (2018.05); *G02B 27/017* (2013.01); *G09G 5/10* (2013.01); *H04N 13/139* (2018.05); *H04N 13/383* (2018.05); *H04N 13/398* (2018.05); *G02B 2027/0123* (2013.01); *G02B 2027/0134* (2013.01); *G09G 2310/0232* (2013.01); *H04N 2213/001* (2013.01)

(58) Field of Classification Search
None
See application file for complete search history.

(56) References Cited

U.S. PATENT DOCUMENTS

| 5,612,709 | A | 3/1997 | Sudo et al. |
|---|---|---|---|
| 6,064,353 | A | 5/2000 | Hoshi |
| 9,383,582 | B2 * | 7/2016 | Tang .............. G02B 27/0172 |
| 2011/0298900 | A1 * | 12/2011 | Inaba .............. G02B 27/2264 |
| | | | 348/47 |
| 2012/0299923 | A1 | 11/2012 | Takahashi |

(Continued)

FOREIGN PATENT DOCUMENTS

| JP | H06-281878 A | 10/1994 |
|---|---|---|
| JP | H07-181424 A | 7/1995 |

(Continued)

*Primary Examiner* — Christopher Braniff
(74) *Attorney, Agent, or Firm* — Oliff PLC

(57) ABSTRACT

First and second display devices have first and second common display areas in which image display with common content to left and right eyes is performed. At least one of the first and second display devices has an extended display area. A display control unit generates a signal including common image information for the first and second common display areas and extension image information for the extended display area.

18 Claims, 21 Drawing Sheets

(56) References Cited

U.S. PATENT DOCUMENTS

2014/0104142 A1\* 4/2014 Bickerstaff .......... G02B 27/017
345/8
2014/0139553 A1 5/2014 Takeda et al.
2014/0340371 A1 11/2014 Kogure et al.
2015/0123997 A1\* 5/2015 Hayasaka ............ G02B 27/017
345/633
2015/0253578 A1 9/2015 Takahashi

FOREIGN PATENT DOCUMENTS

| JP | H07-302063 A | 11/1995 |
|---|---|---|
| JP | H07-302064 A | 11/1995 |
| JP | 2012-242794 A | 12/2012 |
| JP | 2014-103480 A | 6/2014 |
| JP | 2014-222848 A | 11/2014 |

\* cited by examiner

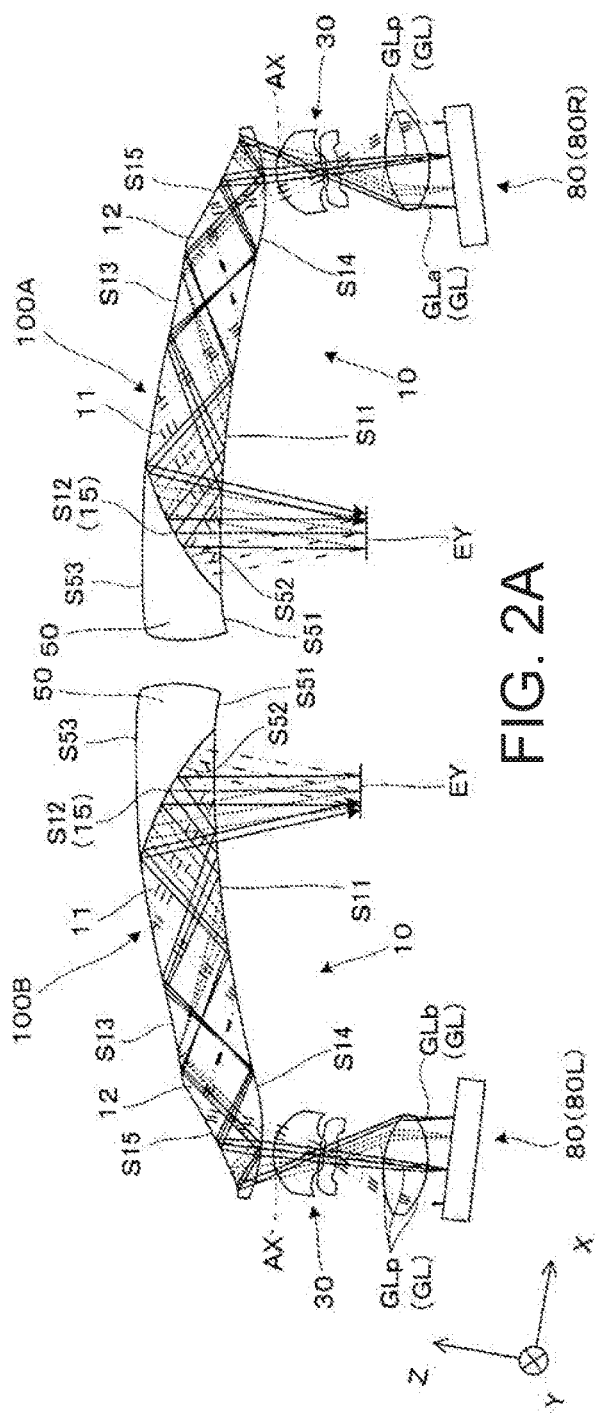
FIG. 2A
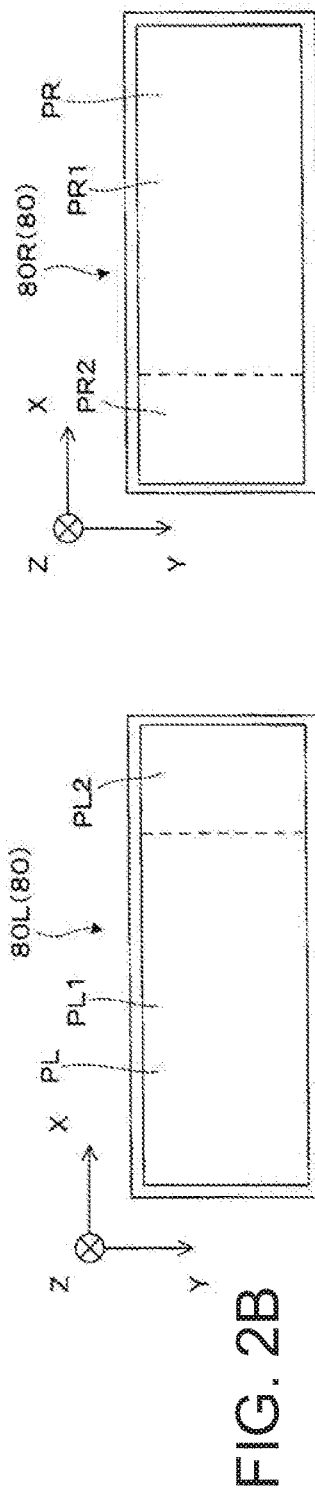
FIG. 2B
FIG. 2C
FIG. 2D
FIG. 2E

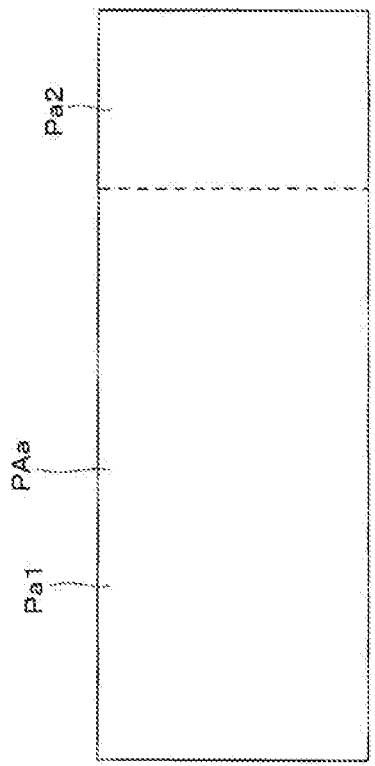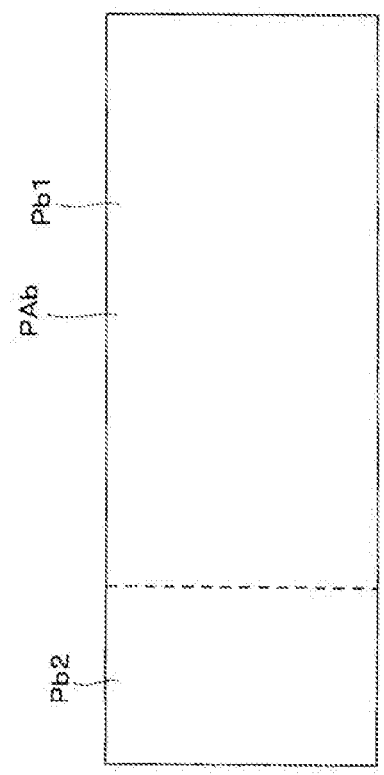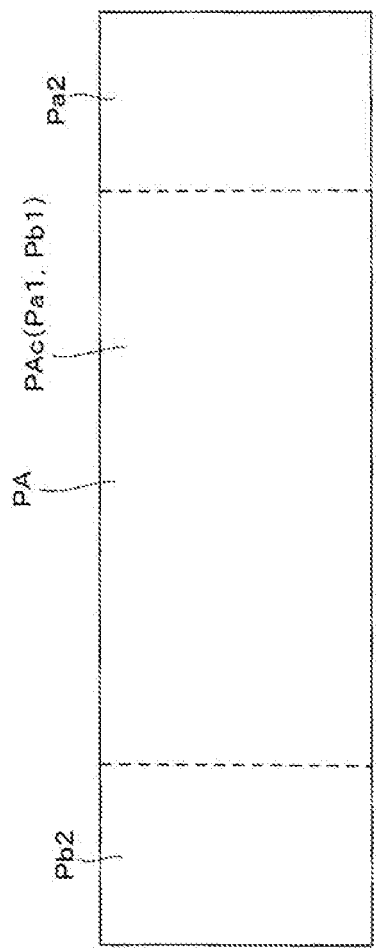

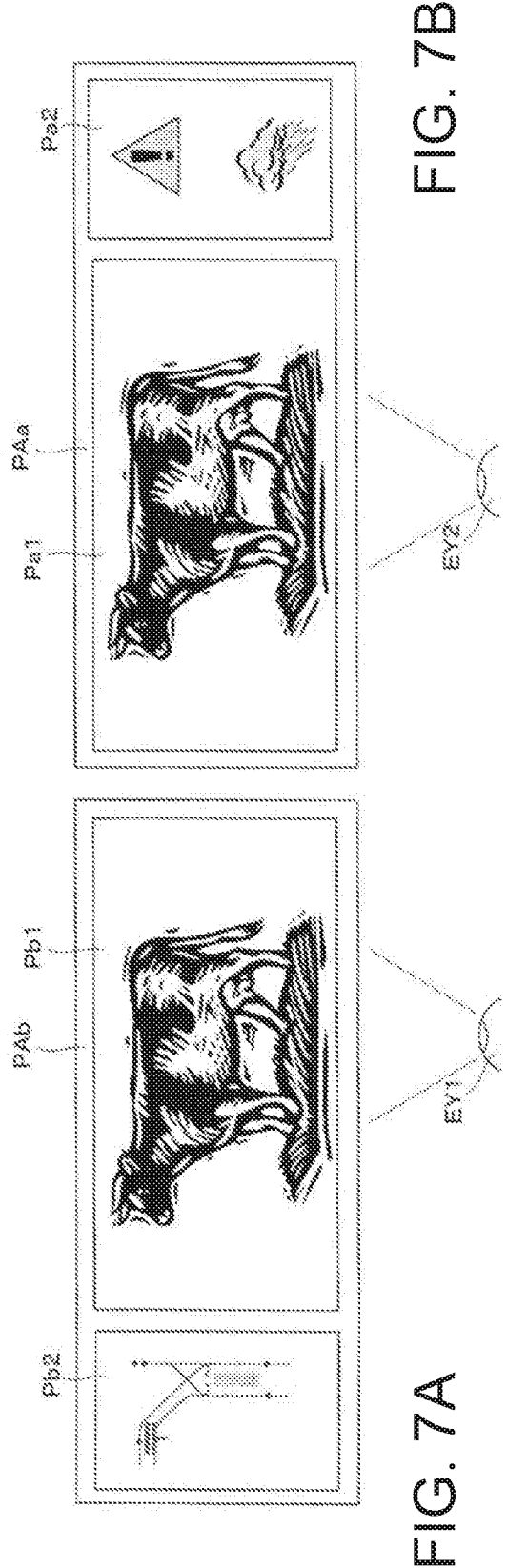
FIG. 7A
FIG. 7B
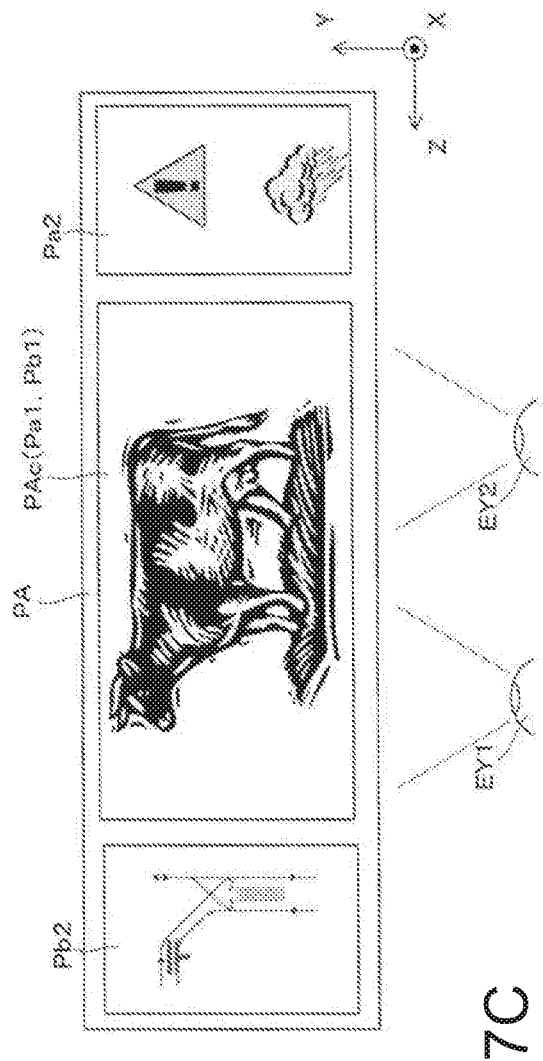
FIG. 7C

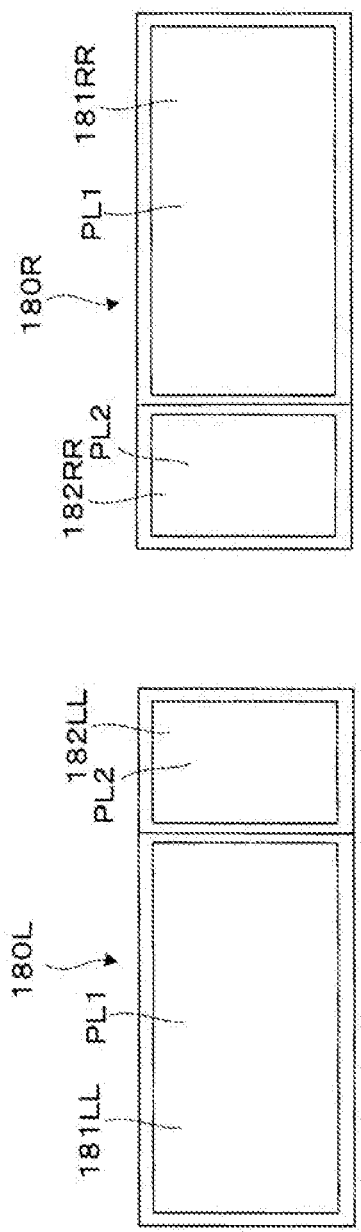

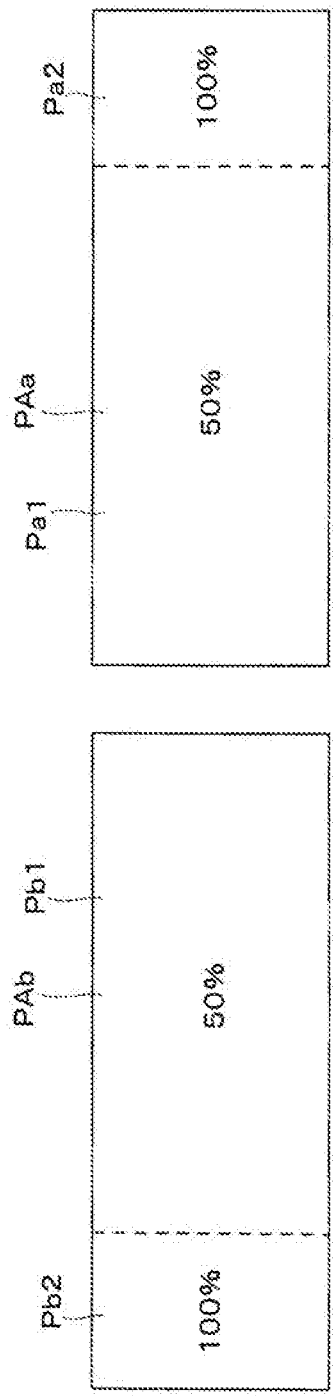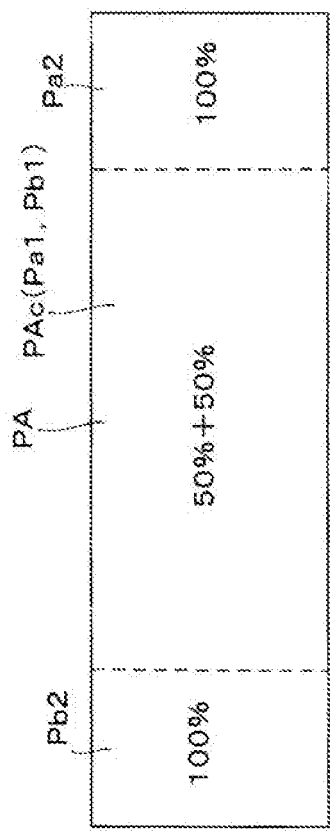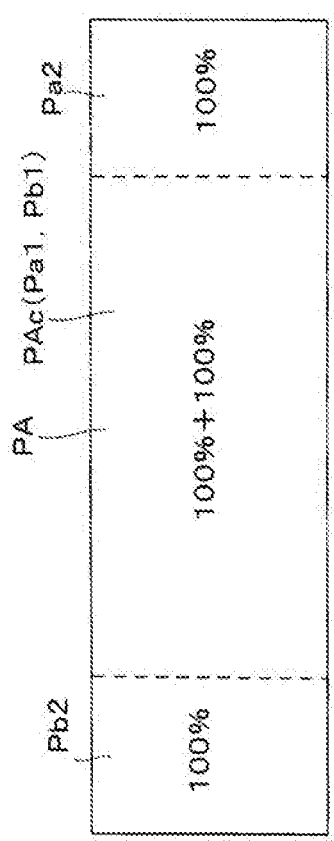

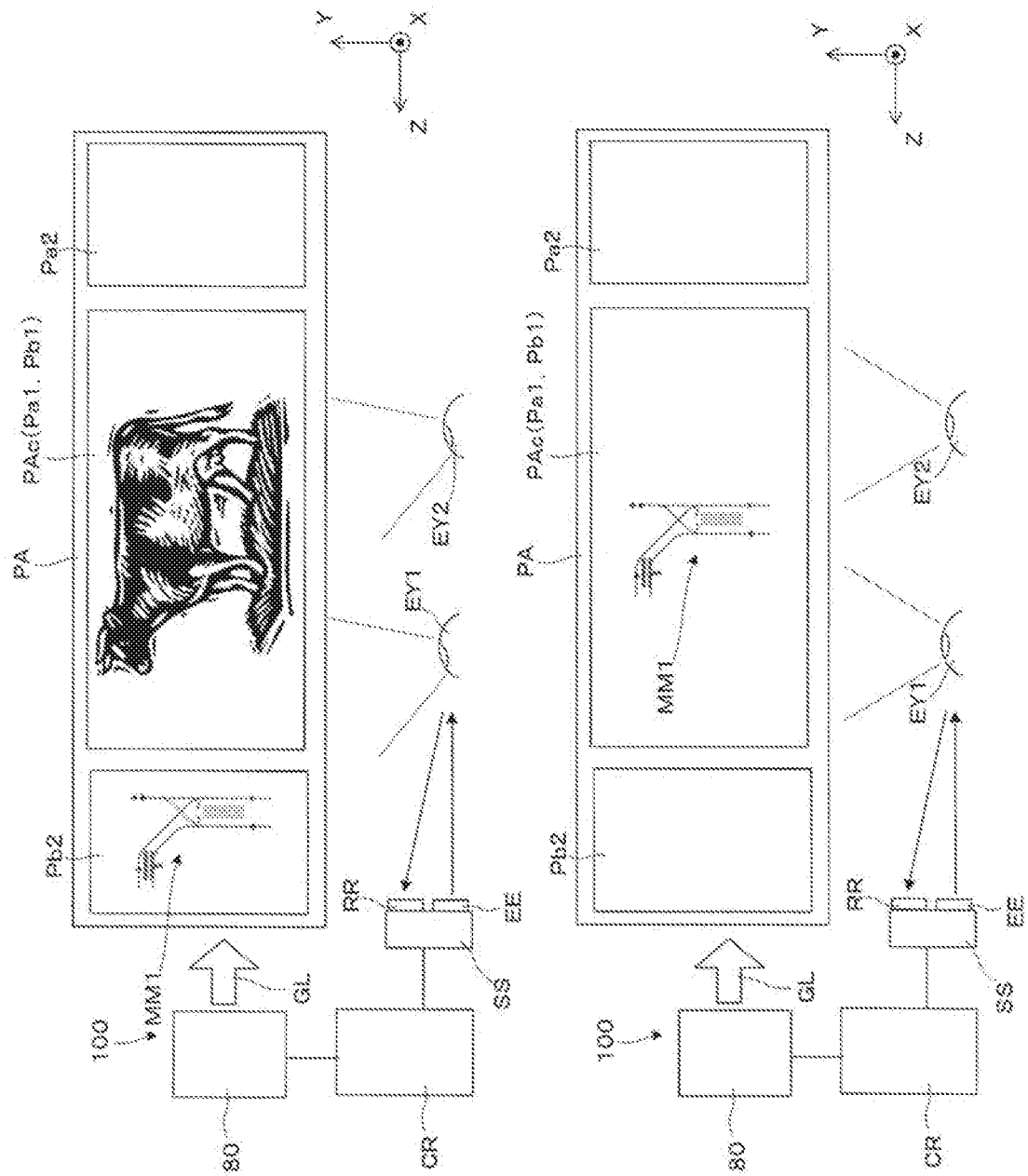

HEAD-MOUNTED DISPLAY DEVICE AND DISPLAY CONTROL METHOD FOR HEAD-MOUNTED DISPLAY DEVICE

BACKGROUND

1. Technical Field

The present invention relates to a head-mounted display device mounted on a head and presenting a video formed by a video element or the like to an observer and a display control method for the head-mounted display device.

2. Related Art

Binoculus head-mounted display devices in which a pair of right and left display devices are provided to project video light to both eyes are known as head-mounted display devices (virtual image display devices) such as head-mounted displays (hereinafter also referred to as HMDs) mounted on the heads of observers (see JP-A-7-302063, JP-A-7-302064, and JP-A-2014-103480).

In head-mounted display devices, while there is a strong request for miniaturizing the devices due to mounting problems, there is a conflicting request for enlarging image display (increasing an information display amount). That is, in general, when an incident angle of video light incident on eyes is widened to enlarge image display, there is a problem in that an optical system and thus an entire device are increased in size. In contrast, when an optical system or the like is decreased in size to miniaturize a device, there is a problem in that an image display area is decreased and thus an information display amount is decreased.

On the other hand, there are known display devices in which when two mutually different screens are recognized with right and left eyes, a fusion process is performed in a human cerebrum centrum, and one large screen seems to be put using the fact that the two different screens are shown just as the screens are connected (see JP-A-7-302063 and JP-A-7-302064).

Further, there is also known a display device in which a pair of right and left virtual forming units are included and a plurality of division video regions are provided and the regions are effectively used to reduce a correction amount through keystone correction at the time of forming a virtual image (JP-A-2014-103480).

Incidentally, in a binocular HMD in which a pair of right and left display devices are included, there is also a request for recognizing a stereoscopic image, for example, by forming an image according to right and left parallaxes. For example, in a case in which different images are connected to be recognized with the right and left eyes just as the images are connected and an image extending to the right and the left is thus formed as in JP-A-7-302063 and JP-A-7-302064, it is considered that it is difficult to recognize a stereoscopic image.

SUMMARY

An advantage of some aspects of the invention is to provide a head-mounted display device and a display control method for the head-mounted display device that includes a pair of right and left display devices, is capable of enabling a video to be recognized through binocular vision, and is capable of displaying an image in various forms while image display is felt large.

A head-mounted display device according to an aspect of the invention includes first and second display units that perform image display to be recognized to correspond to left and right eyes. The first and second display units have first and second common display areas in which image display with common content is performed, and at least one of the first and second display units has an extended display area formed by extending the area of the image display. Here, targets of the common content displayed in the common display areas are videos of various pieces of content of 2D images (planar images) or 3D images (stereoscopic images). As specific examples, moving images such as movies, screens of various applications, and various UI screens are considered.

In the head-mounted display device, the first and second display units have first and second common display areas in which image display with common content to left and right eyes is performed. Thus, image content can be recognized through binocular vision. That is, a stereoscopic image (3D image) can be recognized, for example, by shifting a right image and a left image according to a parallax of the right and left eyes in accordance with a display form of the common content. Further, at least one of the first and second display units has an extended display area, and thus the display area can be extended without a sense of discomfort and the image display can be seen larger than in a case in which only the common display area is displayed. In this case, since an optical system or the like equivalent to only the display of the common display area may be enlarged, the device can be miniaturized more than in a case in which the display area is increased due to an increase in the size of the entire device.

In another aspect of the invention, the head-mounted display device further includes a display control unit that transmits a video signal for controlling display operations of the first and second display units and controls the image display, and the display control unit generates a signal including common image information for the first and second common display areas and extension image information for the extended display area, as the video signal to be transmitted to the first and second display units.

In the head-mounted display device, the display control unit generates a signal including the common image information for the first and second common display areas and the extension image information for the extended display areas, it is possible to perform various kinds of image display including the foregoing image (3D image).

A display control method of a head-mounted display device according to another aspect of the invention is a display control method of a head-mounted display device including first and second display units that perform image display to be recognized to correspond to left and right eyes. The first and second display units have first and second common display areas in which image display with common content is performed, and at least one of the first and second display units has an extended display area formed by extending the area of the image display. A signal including common image information for the first and second common display areas and extension image information for the extended display area is generated as a video signal to be transmitted to the first and second display units.

In the display control method of a head-mounted display device, the first and second display units have first and second common display areas in which image display with common content to left and right eyes is performed. Thus, in the display control of the head-mounted display device in which the image content can be recognized through binocular vision, various kinds of image display can be performed by generating the signal including the common image information for the first and second common display areas and the extension image information for the extended display areas.

A display control program of a head-mounted display device according to another aspect of the invention is a display control program of a head-mounted display device including first and second display units that perform image display to be recognized to correspond to left and right eyes. The first and second display units have first and second common display areas in which image display with common content is performed, and at least one of the first and second display units has an extended display area formed by extending the area of the image display. A signal including common image information for the first and second common display areas and extension image information for the extended display area is generated as a video signal to be transmitted to the first and second display units.

In the display control program of a head-mounted display device, the first and second display units have first and second common display areas in which image display with common content to left and right eyes is performed. Thus, in the display control of the head-mounted display device in which the image content can be recognized through binocular vision, various kinds of image display can be performed by generating the signal including the common image information for the first and second common display areas and the extension image information for the extended display areas.

BRIEF DESCRIPTION OF THE DRAWINGS

The invention will be described with reference to the accompanying drawings, wherein like numbers reference like elements.

FIG. 2A is a diagram conceptually illustrating a light path of video light. FIGS. 2B and 2C are diagrams conceptually illustrating an example of a pair of right and left video elements. FIGS. 2D and 2E are diagrams conceptually illustrating passing regions of the video light on a half mirror in light guiding of a pair of right and left light-guiding members.

FIGS. 3A and 3B are diagrams illustrating a pair of right and left video regions. FIG. 3C is a diagram conceptually illustrating an entire video region recognized through binocular vision.

FIGS. 7A and 7B are diagrams illustrating a pair of right and left video regions according to a modification example. FIG. 7C is a diagram conceptually illustrating a video region recognized through binocular vision.

FIGS. 8A and 8B are diagrams conceptually illustrating a modification example of a pair of right and left video elements.

FIGS. 15A and 15B are diagrams conceptually illustrating an example of luminance in a pair of right and left video regions. FIG. 15C is a diagram conceptually illustrating an example f luminance in an entire video region recognized through binocular vision. FIG. 15D is a diagram conceptually illustrating another example of luminance in the entire video region recognized through binocular vision.

FIGS. 19A and 19B are diagrams illustrating another modification example of the display operation.

DESCRIPTION OF EXEMPLARY EMBODIMENTS

Hereinafter, a head-mounted display device according to an embodiment of the invention will be described in detail with reference to FIG. 1 and the like.

Figure 1:
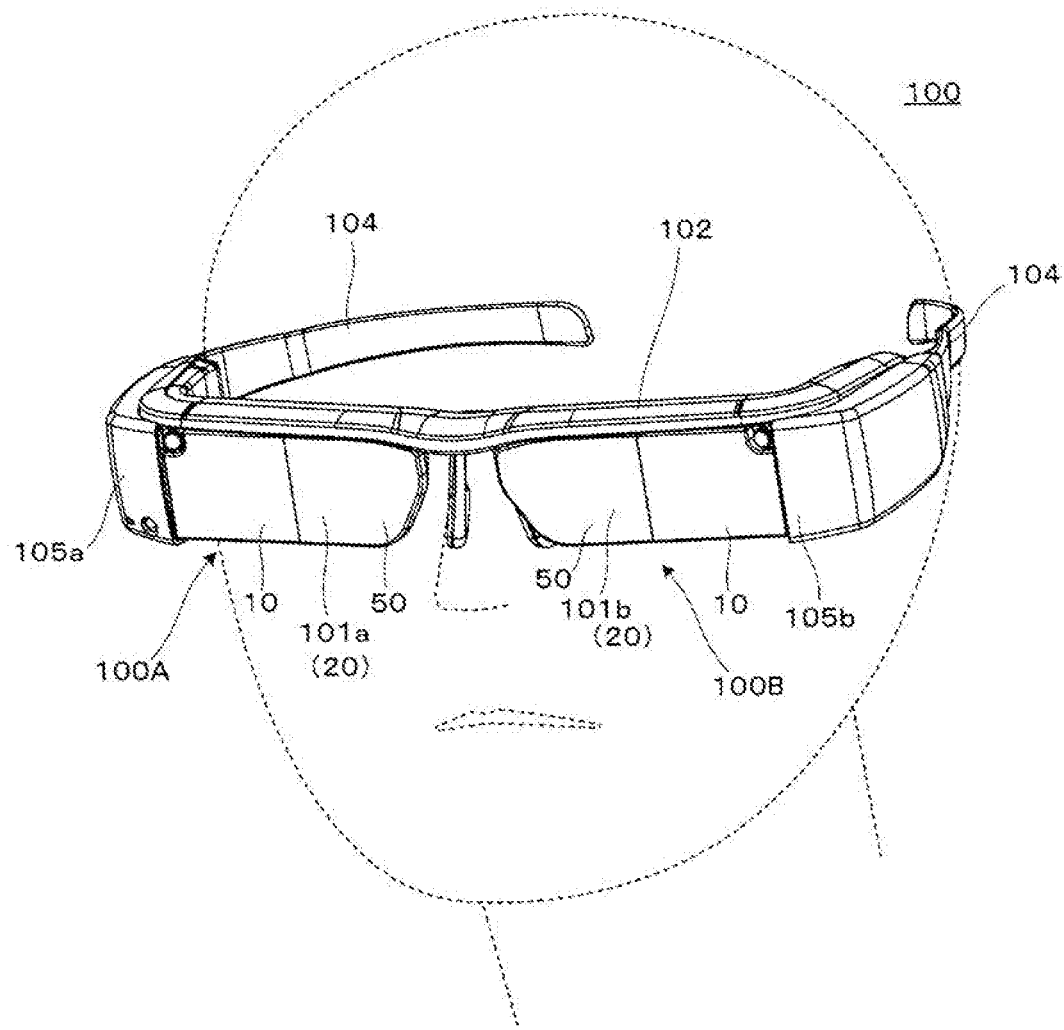
FIG. 1 is a diagram illustrating a head-mounted display device according to an embodiment.

As illustrated in FIG. 1, a head-mounted display device 100 according to the embodiment is a head-mounted display that has an outer appearance such as glasses. The head-mounted display device 100 is a virtual image display device that enables an observer or a user on which the head-mounted display device 100 is mounted to recognize image light (video light) as a virtual image and simultaneously enables the observer to recognize or observe an external image in a see-through manner. The head-mounted display device 100 includes first and second optical members 101a and 101b that cover the front of the eyes of an observer to be see-through, a frame 102 that holds both the optical members 101a and 101b, and first and second image forming body sections 105a and 105b that are disposed in portions extending from both right and left ends of the frame 102 to temple portions (temples) 104 on the rear side. Here, a first display device 100A in which the first optical member 101a and the first image forming body section 105a on the left side of the drawing are combined is a first display unit that forms a right-eye virtual image. Further, a second display device 100B in which the second optical member 101b and the second image forming body section 105b on the right side of the drawing are combined is a second display unit that forms a left-eye virtual image. By comparing FIGS. 1 and 2A to each other, for example, it can be understood that the first and second image forming body sections 105a and 105b are each configured to include a projection lens 30 and an image display device 80 accommodated in a lens tube (not illustrated). That is, the projection lens 30 and the image display device 80 illustrated in FIG. 2A are accommodated inside each of the first and second image forming body sections 105a and 105b illustrated in FIG. 1. For example, the first image forming body section 105a can be said to be configured to include the image display device 80 and the projection lens 30.

Hereinafter, the configurations of optical systems in the head-mounted display device 100 will be described with reference to FIG. 2A. In the embodiment, the configurations of the optical systems have a pair of right and left symmetry and have the same function and operation.

The image display devices 80 (a right-eye image display device 80R and a left-eye image display device 80L) can be configured as image display elements (video elements) each configured to include a spontaneous element such as an organic EL. For example, the image display devices 80 may be configured to include an illumination device (not illustrated) which is a backlight emitting illumination light to the image display element or a driving control unit (not illustrated) controlling an operation as well as the image display element (video element) which is a transmissive spatial light modulation device.

The projection lens 30 is a projection optical system that includes a plurality (for example, 3) of optical elements (lenses) arranged along an incident-side optical axis AX, and such an optical element is held to be accommodated by the lens tube, as described above. The optical element is configured with an aspheric lens that has both a non-axisymmetrically aspheric surface (non-axisymmetric aspheric surface) and an axisymmetrically aspheric surface (axisymmetric aspheric surface), and thus can form an intermediate image corresponding to a display image inside a light-guiding member 10 in cooperation with a part of the light-guiding member 10. The projection lens 30 causes video light formed by the image display device 80 to be incident toward a light-guiding device 20.

The light-guiding device 20 is configured to include the light-guiding and transmission light-guiding member 10 and a transmission light transmission member 50. The light-guiding member 10 is a part of a prism type light-guiding device 20 and can be comprehended to be divided into a first light-guiding portion 11 on the light emission side and a second light-guiding portion 12 on the light incidence side although the light-guiding member 10 is an integrated member. The light transmission member 50 is a member (assistant optical block) that assists a see-through function of the light-guiding member 10 and is fixed to be integrated with the light-guiding member 10 to serve as one light-guiding device 20. For example, the light-guiding device 20 is fastened to the lens tube that accommodates the projection lens 30 to be positioned and fixed to the projection lens 30 with high precision.

The light-guiding member 10 serving as a side surface having an optical function includes first to fifth surfaces S11 to S15. Of the side surfaces, the first surface S11 and the fourth surface S14 are continuously adjacent, and the third surface S13 and the fifth surface S15 are continuously adjacent. The second surface S12 is disposed between the first surface S11 and the third surface S13. A half mirror layer 15 is installed to be annexed to the front surface of the second surface S12. The half mirror layer 15 is a reflection film having a light transmission property (that is, a transflective film) and is formed by forming a metal reflection film or a dielectric multiplayer so that video light to reflectivity is appropriately set.

The light transmission member 50 is a member (assistant optical block) that is fixed to be integrated with the light-guiding member 10 to form one light-guiding device 20 and assists a see-through function of the light-guiding member 10, as described above. The light transmission member 50 serving as a side surface having an optical function has a first transmission surface S51, a second transmission surface S52, and a third transmission surface S53. The second transmission surface S52 is disposed between the first transmission surface S51 and the third transmission surface S53. The first transmission surface S51 is on a surface formed by extending the first surface S11 of the light-guiding member 10, the second transmission surface S52 is a curved surface joined to be integrated with the second surface S12, and the third transmission surface S53 is on a surface formed by extending the third surface S13 of the light-guiding member 10.

Hereinafter, observation of an external image in the light-guiding device 20 will be described in brief. The light-guiding device 20 enables video light to be recognized by an observer by guiding the video light in the light-guiding member 10 and simultaneously enables an external image with a small distortion to be observed by the observer in cooperation with the light-guiding member 10 and the light transmission member 50. That is, of external light which is component light forming an external image to be recognized, light incident on the side of the light-guiding member 10 from the second surface S12 of the light-guiding member 10 passes through the third surface S13 and the first surface S11 of the first light-guiding portion 11. At this time, the third surface S13 and the first surface S11 are planes (a diopter scale of about 0) substantially parallel to each other, and thus aberration or the like rarely occurs. Of the external light, light incident on the side of the light transmission member 50 from the second surface S12 of the light-guiding member 10 passes through the third transmission surface S53 and the first transmission surface S51 included in the light transmission member 50. At this time, the third transmission surface S53 and the first transmission surface S51 are planes substantially parallel to each other, and thus aberration or the like rarely occurs. Further, of the external light, light incident on the light transmission member 50 corresponding to the second surface S12 of the light-guiding member 10 passes through the third transmission surface S53 and the first surface S11. At this time, the third transmission surface S53 and the first surface S11 are planes substantially parallel to each other, and thus aberration or the like rarely occurs. In this way, the observer observes the external light with no distortion beyond the light transmission member 50.

The light path of the video light (here, referred to as video light GL) has been described in brief with reference to FIG. 2A and the like. FIG. 2A conceptually illustrates the light path of the video light GL. FIGS. 2B and 2C conceptually illustrate an example of the image display devices 80R and 80L which are a pair of right and left image display elements (video elements) that emit the video light GL. In the image display devices 80R and 80L, display panel regions PR and PL illustrated in FIGS. 2B and 2C serve as light emission surfaces, and the video light GL is emitted toward the projection lenses 30 on the right and left sides. The projection lenses 30 project the video light GL toward the light-guiding members 10. The light-guiding members 10 cause the video light GL to be incident from the projection lenses 30 and guide the light toward the eyes of the observer through reflection or the like from the first to fifth surfaces S11 to S15. Specifically, the video light GL from the projection lenses 30 is incident on the fourth surface S14 and reflected from the fifth surface S15, is incident on the fourth surface S14 again from the inside and totally reflected, is incident on the third surface S13 and totally reflected, and is incident on the first surface S11 and totally reflected. The video light GL totally reflected from the first surface S11 is incident on the second surface S12, is partially reflected while being partially transmitted through the half mirror layer 15 formed on the second surface S12, and is incident on the first surface S11 again to pass. The video light GL passing through the first surface S11 is incident as a substantially parallel light flux on the eyes of the observer or an equivalent position. That is, the observer observes an image through the video light as a virtual image. The video light GL is emitted so that the video light is viewed at the center of an eye EY of the observer on the basis of the optical axis AX.

In particular, in the embodiment, the video light GL is configured to include component light GLp that forms a main video on the middle side for binocular vision, and pieces of component light GLa and GLb that form secondary videos on periphery sides for monocular vision of one of the left and right eyes. The component light GLp becomes a bundle of rays which are lateral symmetric centering on the central optical axis AX to form an image that has a symmetric property, for example, on the basis of the central optical axis AX set to correspond to the axis of a visual line (that is, to correspond to an axis along which the light is emitted at an angle at which the light is recognized right in front), and is emitted from one pair of right and left image display devices 80 (80R and 80L). On the other hand, the pieces of component light GLa and GLb forming the images on the periphery side are biased. For example, the component light GLa emitted from the right-eye image display device 80R is shifted to the inside (the left side closer to the observer) of a panel surface of the image display device 80R with reference to the optical axis AX to form an image for monocular vision on the periphery side of the right eye. In other words, in the first and second display devices 100A and 100B, the centers of the display panel regions PR and PL are shifted from the central optical axis AX. The component light GLa is emitted to be inclined from a region on the further right side of a range in which the component light GLp is emitted, as apparent from a tracked light path in the drawing. Similarly, the component light GLb emitted from the left-eye image display device 80L is shifted to the inside (the right side closer to the observer) of a panel surface of the image display device 80L with reference to the central optical axis AX, and thus is emitted to be inclined from a region on the further left side of the range in which the component light GLp is emitted. From a different viewpoint, the pieces of component light GLa and GLb are emitted in the range (the inside) extended from the emission range of the component light GLp, and thus all the bundle of rays are formed in the range extended inside on the basis of the central optical axis AX.

Here, emission positions and the like of the component light GLp, the component light GLa, and the component light GLb of the video light GL described above will be described with reference to FIGS. 2B, 2C, and the like. First, as illustrated in FIGS. 2B and 2C, in the display panel regions PR and PL of the image display devices 80R and 80L which are emission surfaces of the video light GL, the component light GLp is different from the pieces of component light GLa and GLb in emission position. That is, the display panel regions PR and PL are configured to be divided into first regions PR1 and PL1 which are formed in ranges including middle sides and through which the component light GLp is emitted and second regions PR2 and PL2 which are formed on periphery sides of the first regions PR1 and PL1 and through which the pieces of component light GLa and GLb are emitted, respectively. That is, the component light GLp for binocular vision is emitted from the first regions PR1 and PL1, and the pieces of component light GLa and GLb for forming videos recognized only with corresponding one eye are emitted from the second regions PR2 and PL2. As described above, in a case in which the single display panel regions PR and PL are divided and the component light GLp and the pieces of component light GLa and GLb are formed, boundary portions of the regions are continuously connected to be adjacent.

In the half mirror layers 15 (a right-eye half mirror layer 15R and a left-eye half mirror layer 15L) which are reflection surfaces for extracting images, as illustrated in FIGS. 2D and 2E, at emission positions of the component light GLp, the component light GLa, and the component light GLb of the video light GL at the time of extraction from the light-guiding device 20, first reflection regions AR1 and AL1 reflecting the component light GLp partially overlap second reflection regions AR2 and AL2 reflecting the pieces of component light GLa and GLb. However, as a whole, the second reflection regions AR2 and AL2 are shifted to the outside (the farther side from the observer) than the first reflection regions AR1 and AL1. The pieces of component light GLa and GLb emitted from the second reflection regions AR2 and AL2 are emitted from the light-guiding devices 20 at angles inclined more than the component light GLp and arrive at the eyes EY of the observer. As a result, the observer recognizes images (videos) originating from the pieces of component light GLa and GLb as images more outside than an image (video) originating from the component light GLp.

In FIGS. 3A, 3B, and 3C, video regions on virtuality corresponding to virtual images recognized with the left and right eyes EY (EY1 and EY2) of the observer, as described above, are indicated by video regions PAa and PAb. Further, a whole video region on the virtuality recognized in the brain of the observer as the result of the recognition with both the eyes EY1 and EY2 is assumed to be a video region PA. Here, in the video regions PAa and PAb, video regions originating from the above-described component light GLp to be recognized are assumed to be first video regions Pa1 and Pb1, and video regions originating from the pieces of component light GLa and GLb to be recognized are assumed to be second video regions Pa2 and Pb2. In this case, the video region PA illustrated in FIG. 3C is recognized as one region formed by connecting a first video region PAc recognized at the time of overlapping the first video regions Pa1 and Pb1 to the second video regions Pa2 and Pb2.

Hereinafter, recognition of the video regions described above will be described. As a premise, a pair of left and right pieces of component light GLp is emitted based on standard positions (optical axes of visual lines) assumed as the eyes EY1 and EY2 of the observer. Thus, when the same image is recognized with both the eyes EY1 and EY2, the observer recognizes the image entered from the left and right eyes EY1 and EY2 as one image. That is, an image with common content to the first video regions Pa1 and Pb1 is formed on the basis of the optical axis of the visual line in the video regions PAa and PAb to be recognized as one video region (the first video region PAc) in the middle of FIG. 3C. In this case, it is known that the observer can further recognize the second video regions Pa2 and Pb2 extending from the first video region PAc to the right and left as regions continuous from the first video region PAc without a sense of discomfort. As a result, the observer can comprehend the whole region in which the first video region PAc and the second video regions Pa2 and Pb2 are connected as one large video region.

As described above, the head-mounted display device 100 according to the embodiment is configured such that an area used to perform image display with common content and extended areas formed to be adjacent to extend the area are formed and these areas are comprehended as an integrated image display area. Hereinafter, the area used to perform the image display with the common content is referred to as a common display area and the extended areas are referred to as extended display areas. Targets of the common content displayed in the common display area are videos of various pieces of content of 2D images (planar images) or 3D images (stereoscopic images). As specific examples, moving images such as movies, various application screens, and various UI screens are considered. The common display area and the extended display areas can be defined as physical spaces, that is, the first regions PR1 and PL1 and the second regions PR2 and PL2 of the display panel regions PR and PL illustrated in FIGS. 2B and 2C or the first reflection regions AR1 and AL1 and the second reflection regions AR2 and AL2 illustrated in FIGS. 2D and 2E. Here, the regions can be assumed to be further extended and comprehended as regions (virtual spaces) such as the video regions PAa, PAb, and PA recognized as a virtual range to correspond to the physical spaces and illustrated in FIGS. 3A to 3C. In the common display area in which the image display with the common content is performed, a common display area used to perform image display to be recognized with the right eye is referred to as a first common display area and a common display area used to perform image display to be recognized with the left eye is referred to as a second common display area. Further, in the extended display area, an extended display area used to perform image display to be recognized with the right eye is referred to as a first extended display area and an extended display area used to perform image display to be recognized with the left eye is referred to as a second extended display area. In the foregoing case, a whole display area in which a display area formed by integrating the middle common display areas (the first and second common display areas) and the first and second extended display areas extended to the right and left is recognized is premised. In the foregoing case, the extended display areas are continuously adjacent to the outer edge sides of the common display areas (the first common display area and the second common display area), and thus can be recognized as a continuous image without a sense of discomfort.

Further, in the foregoing example, in the common display area, that is, the video region PAc in FIG. 3C which is a range for binocular vision, not only can 2D images (planar images) completely matched in units of pixels be displayed, but 3D images (stereoscopic images) can also be displayed by shifting the images according to right and left parallaxes from a common image. On the other hand, only 2D image display can be performed in the extended display areas, that is, the second video regions Pa2 and Pb2 recognized through monocular vision.

Figure 4:
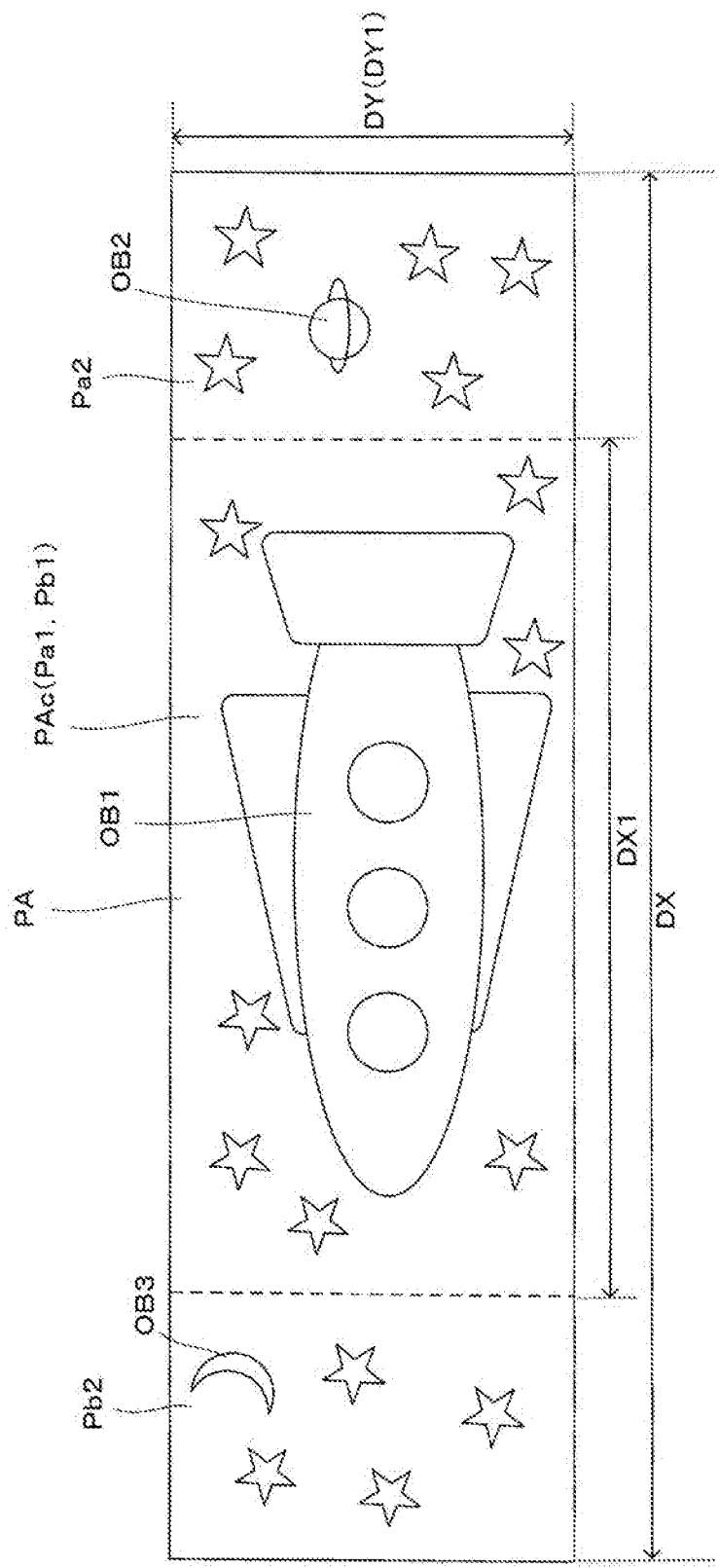
FIG. 4 is a diagram illustrating an example of an entire image form recognized through binocular vision.

FIG. 4 is a diagram corresponding to FIG. 3C and a diagram illustrating an example of the form of a whole image recognized through binocular vision and monocular vision. In this case, for example, of image objects OB1 to OB3 to be displayed, for example, a stereoscopic image can be formed by performing appropriate image processing on the image object OB1 (a rocket image object) displayed in a middle video region PAc. On the other hand, since the image objects OB2 and OB3 (planet image or moon image objects) displayed in the video regions Pa2 and Pb2 on the periphery sides are monocular vision, only planar images can be displayed. However, by forming an image so that the middle video region PAc is taken to be sufficiently large, it is possible that a stereoscopic image seems to be formed in the whole image of the display area.

Figure 5A:
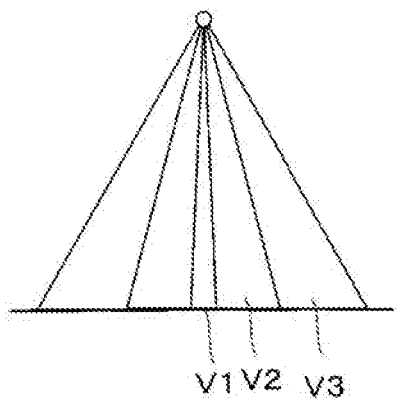
FIGS. 5A to 5C are conceptual diagrams illustrating a visual field of an observer.
Figure 5B:
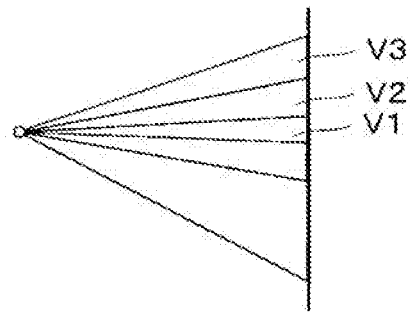
Figure 5C:
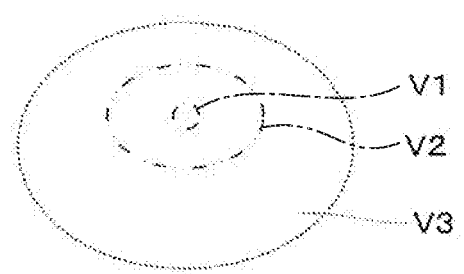
Figure 6:
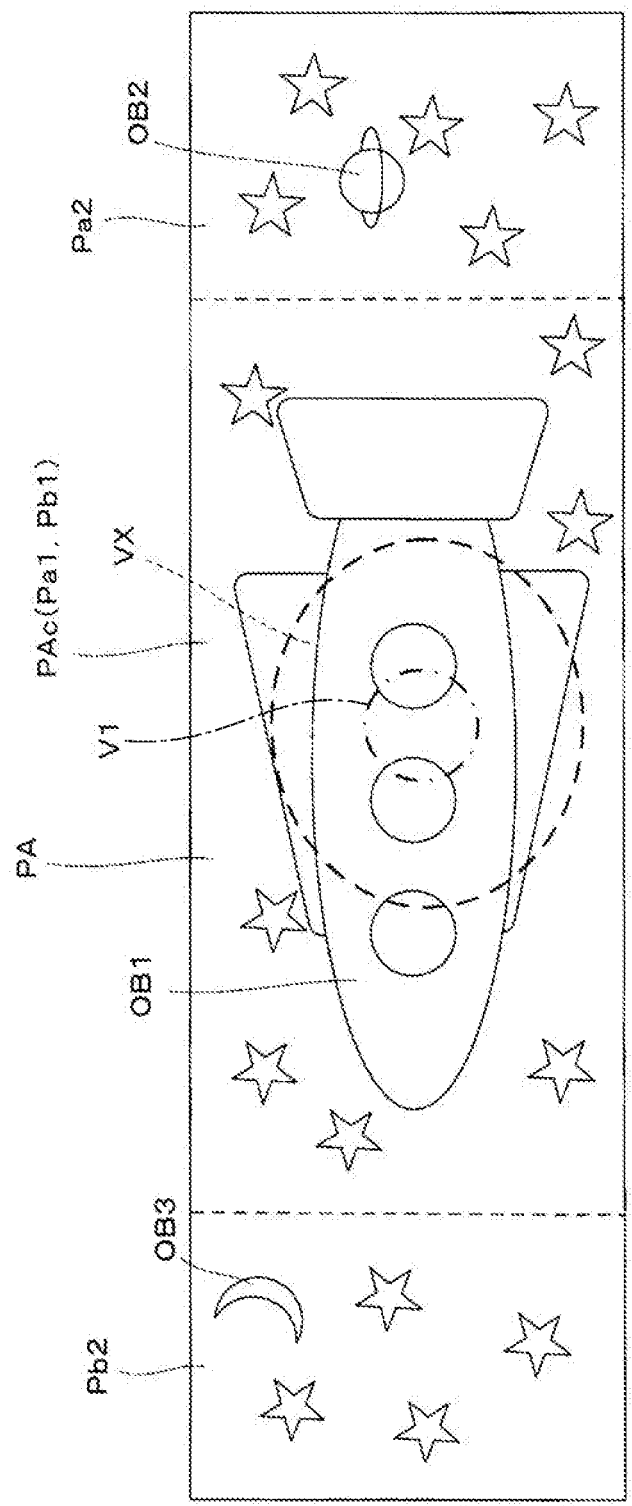
FIG. 6 is a diagram illustrating a relation between a visual field of an observer and a display range of an image recognized through binocular vision.

Hereinafter, characteristics of a view field of an observer will be described with reference to FIGS. 5A to 5C and the like. First, FIGS. 5A to 5C are conceptual diagrams illustrating a visual field of the observer. FIG. 5A illustrates the form of a horizontal visual field. FIG. 5B illustrates the form of a perpendicular (vertical) visual field. FIG. 5C illustrates the form of a visual field projected to a surface (expansion of a visual field in a visual line direction). Here, in each drawing, a discrimination visual field V1 is central region (within an angle of view of about) 5° in which a visual function such as eyesight is excellent. An effective visual field V2 is a region (within a horizontal angle of about 30° and a vertical angle of about 20°) in which information is necessary instantly with only an eyeball movement. A stable fixation field V3 is a region (within a horizontal angle of 60 to 90° and a vertical angle of 45 to 70°) in which an attention can be paid effortlessly with an eyeball and head movement and effective information is necessary. For example, when the discrimination visual field V1 among these fields is kept in mind and a visual line direction of an observer viewing a video is considered to be normally an approximate front direction, a stereoscopic image can seem to be seen in a whole image of a display area by providing the video region PAc in a sufficient range from the center of the image in the discrimination visual field V1 and including a range in which a visual function is excellent in a range in which the stereoscopic image can be formed. That is, for example, as illustrated in FIG. 6, by including a range of at least the discrimination visual field V1 (an angle of view of about 5°) as a recognition range in the video region PAc and including a visual field VX (which is a range narrower than the effective visual field V2) as the recognition range which is a range with an angle of view of 10° considered as a range in which a letter can be identified, it is possible to ensure recognition of various images such as recognition of a stereoscopic image or recognition of an image with many letters and then expand an image display area.

Here, referring back to FIG. 4, an aspect ratio of the video region PA which is all the image display areas (the common display area and the extended display area) extended from another viewpoint, that is, all of the video region, that is, a ratio of a long side width DX to a short side width DY of the video region PA illustrated in the drawing, will be described. The aspect ratio can be set variously. For example, an aspect ratio conforming to a video format can be set. Further, a ratio of a long side width DX1 to a short side width DY1 of the video region PAc (a binocularly visible region) illustrated in the drawing may be an aspect ratio conforming to a video format. As the aspect ratio of the video format, for example, a cinema-scope size of 1:2.35 can be considered in addition to 3:4 and 9:16. The virtual video region PA and the like have been described above as the image display area (the common display area and the extended display area). The same can be examined in a physical space. For example, in the case of the panel type structure as in the embodiment, an aspect ratio of a video recognized by setting the aspect ratios of the first regions PR1 and PL1 or the second regions PR2 and PL2 of the display panel regions PR and PL illustrated in FIGS. 2B and 2C can be set to an aspect ratio conforming to a desired video format. More specifically, for example, the panel type structure is considered to be adjusted by performing adjustment in such a manner that right-eye and left-eye images are each set to vertical 720 and horizontal 1580, a 301st pixel from the left of a left display area is matched with a 1st pixel of a right display area, and a 1580th pixel from the left of a left display area is matched with a 1280th pixel of a right display area. Further, roughly speaking, in a case in which virtual images are displayed in the display devices 100A and 100B to form an image equivalent to 60 inches before 2.5 m, an image equivalent to 80 inches can be recognized by appropriately overlapping and recognizing the virtual images, as described above. For example, by overlapping the video region PAc recognized (binocularly viewed) so that ¼ to half or more of video regions formed by the display devices 100A and 100B, it is possible to ensure a range sufficiently recognized as an image only in the video region PAc. In contrast, the areas of the monocular vision can be set in various ranges. However, for example, it is possible to ensure a region equivalent to the minimum number of pixels necessary to recognize letters or the like for subtitles of a movie.

As described above, the head-mounted display device 100 according to the embodiment is of a binocular vision type in which image display is performed for both eyes. Extended regions (areas) with different display content between the right and left are formed in parts of a display image and a common region (area) in which an image with common content to both eyes is shown is also seen. Thus, when the observer recognizes a whole video including up to the extended regions through binocular vision, the observer can be allowed to perceive the whole video. In contrast, in the case of monocular vision in which image display is performed for one eye, a display image is viewed with the one eye and an external world is viewed with the other eye, and thus a recognized target is in a state completely different between the right and left. Therefore, for example, there is a possibility that a state in which visual lines of the right and left eyes are not mixed and the observer becomes squint-eyed. In the head-mounted display device 100 that is of a binocular vision type and allows an image with common content to the right and left eyes to be recognized, a possibility that the same state as the case of the monocular vision type occurs and the observer becomes squint-eyed is avoided.

Hereinafter, a modification example of image content shown in the head-mounted display device 100 will be described. In addition to the case in which a video with one piece of content is recognized as a whole, as illustrated in FIG. 4, for example, a main image (a cow portion) is projected in the middle video region PAc (binocularly visible region), as illustrated in FIGS. 7A, 7B, and 7C. In addition, sub-information images in which attention information, weather forecast, or the like is projected to the video region Pa2 viewed with only the right eye and navigation information or the like is projected to the video region Pb2 viewed with only the left eye may be displayed on the periphery sides. That is, other types of image content may be displayed in the video region Pa2 on the right eye side and the video region Pb2 on the left eye side.

As described above with reference to FIGS. 2B and 2C, the single display panel regions PR and PL are divided to form the component light GLp and the pieces of component light GLa and GLb, but the invention is not limited thereto. For example, as illustrated in FIGS. 8A and 8B, one image display device 180R (or 180L) may be configured to include two image display elements, a first image display element 181RR (or 181LL) and a second image display element 182RR (or 182LL). That is, the individual display panel regions (the first regions PR1 and PL1 or the second regions PR2 and PL2) may be included according to the first and second common display areas and the extended display areas.

Figure 9A:
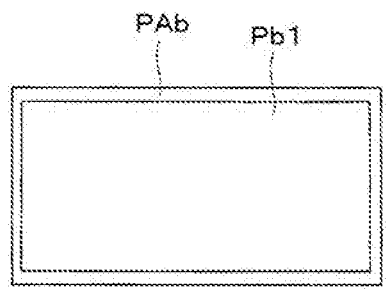
FIGS. 9A and 9B are diagrams illustrating a pair of right and left video regions according to another modification example.
Figure 9B:
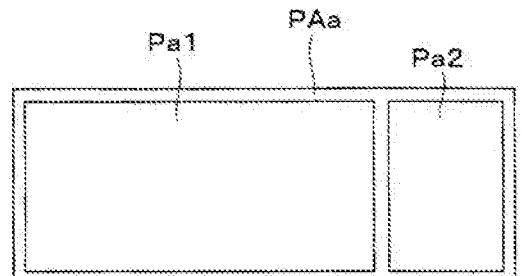
Figure 9C:
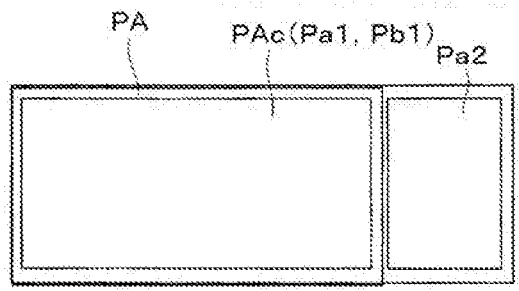
FIG. 9C is a diagram conceptually illustrating a vision region recognized through binocular vision.

The pair of left and right video regions PAa and PAb and the extended display areas have been formed together above. For example, as illustrated in FIGS. 9A, 9B, and 9C, an extended display area may be formed in only one of the video regions. In the case illustrated in the drawing, only the right video region PAa includes both a first video region Pa1 and a second video region Pa2, and the left video region PAb includes only a first video region Pb1.

Figure 9D:
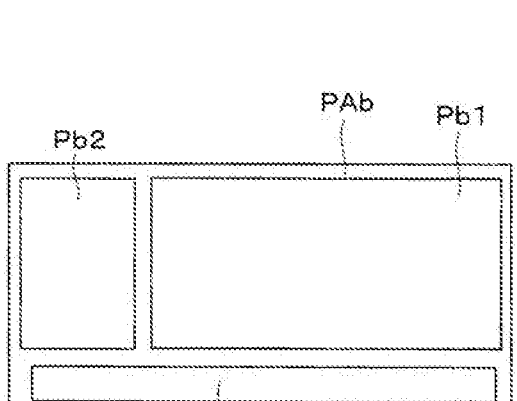
FIGS. 9D and 9E are diagrams illustrating a pair of right and left video regions according to still another modification example.
Figure 9E:
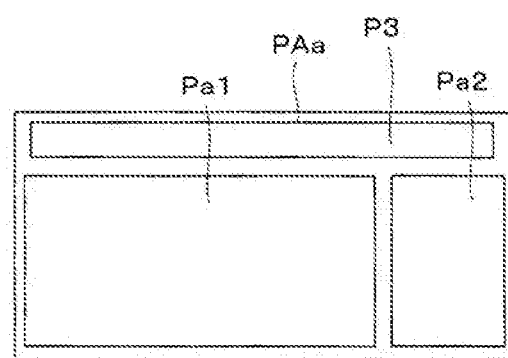
Figure 9F:
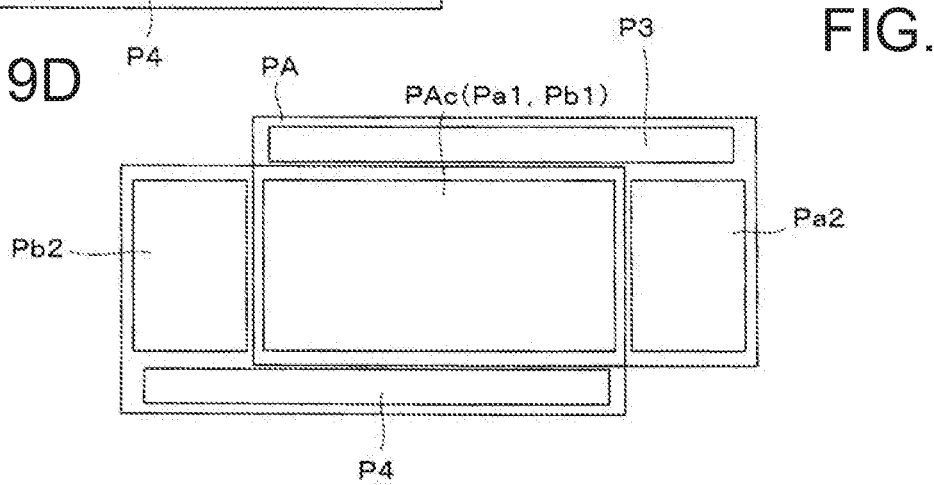
FIG. 9F is a diagram conceptually illustrating a video region recognized through binocular vision.

Further, the extended display areas are formed on the right and left sides which are the periphery sides, but the invention is not limited thereto. For example, as illustrated in FIGS. 9D, 9E, and 9F, a third video region P3 and a fourth video region P4 may be included in the vertical direction in addition to the expansion to the right and left sides.

As described above, in the head-mounted display device 100 according to the embodiment, the first and second display devices 100A and 100B which are the first and second display units have the first and second common display areas in which the image display with the common content to the left and right eyes is performed, and thus the image content with both eyes can be recognized. That is, for example, a stereoscopic image can be recognized according to the display form of the common content. Further, at least one of the first and second display devices 100A and 100B has the extended display area, and thus the display area can be extended without a sense of discomfort and the image display can be seen larger than in the case in which only the common display area is displayed. In this case, since an optical system or the like equivalent to only the display of the common display area may be enlarged, the device can be miniaturized more than in a case in which the display area is increased due to an increase in the size of the entire device.

Figure 10A:
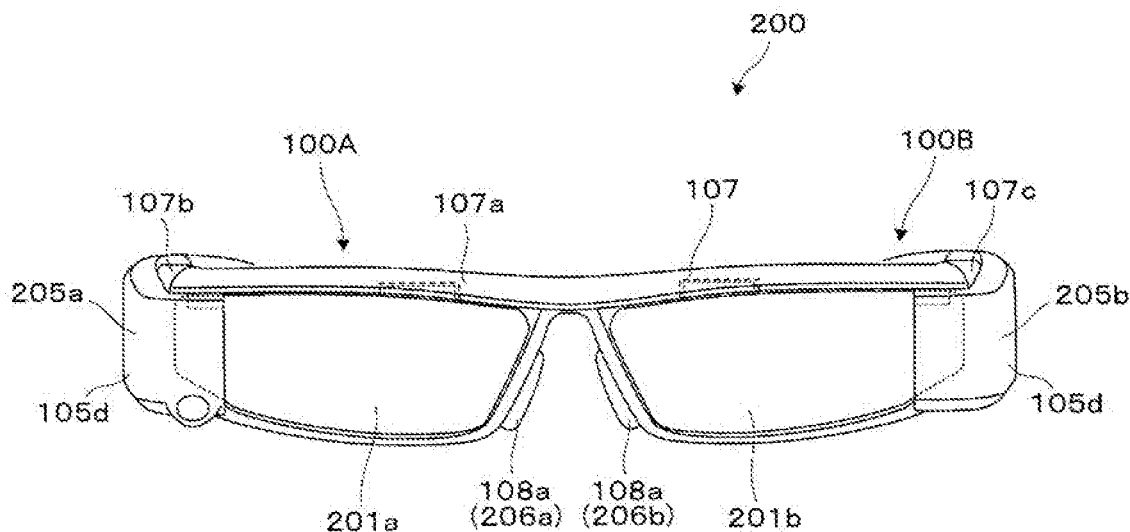
FIG. 10A is a front view illustrating a display device according to further still another modification example.
Figure 10B:
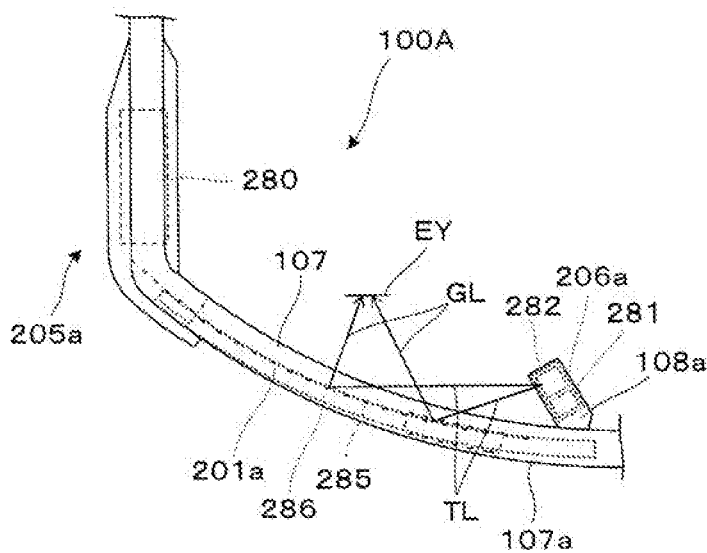
FIG. 10B is a plan view illustrating the structure of a display unit.

Hereinafter, another example of a head-mounted display device will be described with reference to FIGS. 10A and 10B. A head-mounted display device 200 illustrated in the drawing includes first and second optical members 201a and 201b that cover the front of the eyes of an observer to be see-through, a frame 107 that holds both the optical members 201a and 201b, first and second driving units 205a and 205b that are fixed to portions extending from both right and left ends of the frame 107 to the rear side, and first and second video elements 206a and 206b that emit 2-dimensionally scanned signal light. A first display device 100A in which the first optical member 201a, the first driving unit 205a, and the first video element 206a on the left side of the drawing are combined is a section that forms a right-eye virtual image. A second display device 100B in which the second optical member 201b, the second driving unit 205b, and the second video element 206b on the right side of the drawing are combined is a section that forms a left-eye virtual image. When the first display device 100A is inverted right and left, the second display device 100B has the same function as the first display device 100A.

In the first display device 100A, the first video element 206a forms signal light with modulated intensity and emits the signal light as scanning light TL. The first optical member 201a is an irradiated member that forms a video light GL by reflecting the scanning light TL from the first video element 206a and has a function of guiding the video light GL to an eye EY. The first driving unit 205a includes a body section 280 that includes a light source that supplies the first video element 206a with illumination light via an optical fiber or the like (not illustrated) and a control circuit of such an operation.

The first video element 206a is assembled to a nose pad 108a to be indirectly fixed to the frame 107. The first video element 206a includes a signal light modulation unit 281 that modulates the illumination light based on a control signal from the body section 280 and a scanning optical system 282 that emits the signal light while the signal light is scanned through the signal light modulation unit 281. Here, the scanning optical system 282 is configured with an MEMS mirror or the like and performs 2-dimensional scanning to change an emission angle of a light ray to an internal surface of the first optical member 201a by changing an attitude in synchronization with the modulation of the signal light by the signal light modulation unit 281 and adjusting the optical path of the signal light.

The first optical member 201a is disposed to cover the front of an eye EY of the observer on the front side of the first video element 206a or a light emission direction. The first optical member 201a includes a transflective film 285 that is a transflective film irradiated with the scanning light and a holding member 286 that holds and fixes the transflective film 285. Thus, not only a virtual image but also light from an external world enter the eye EY of the observer. The head-mounted display device 200 is configured to be see-through so that both the virtual image and light can be overlapped to be observed.

In the head-mounted display device 200 having the foregoing configuration, an expected purpose can be achieved by adjusting a range of the scanning by the scanning optical system 282.

The pattern of the display area according to the invention is not limited to each of the foregoing embodiments, but can be realized in various forms within the range of the invention without departing from the gist of the invention.

Figures 11A, 11B:
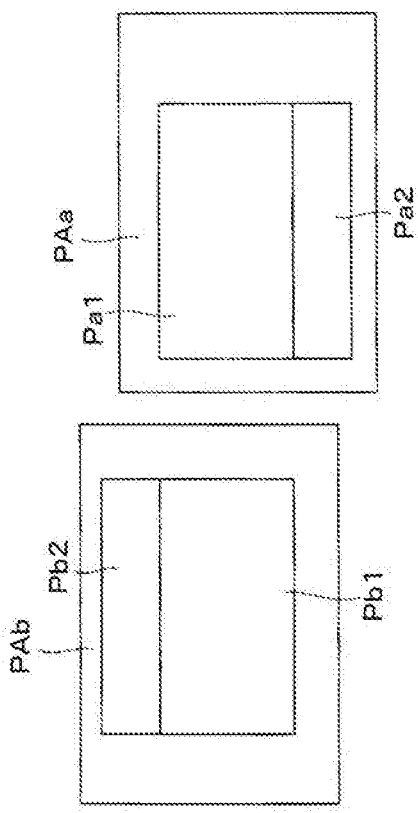
FIGS. 11A and 11B are diagrams illustrating one state of a pair of right and left video regions.
Figures 11D, 11E:
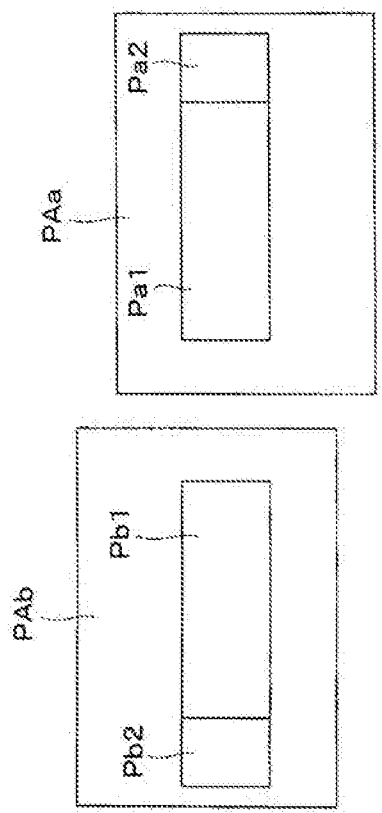
FIGS. 11D and 11E are diagrams illustrating another state of the pair of right and left video regions.
Figure 11C:
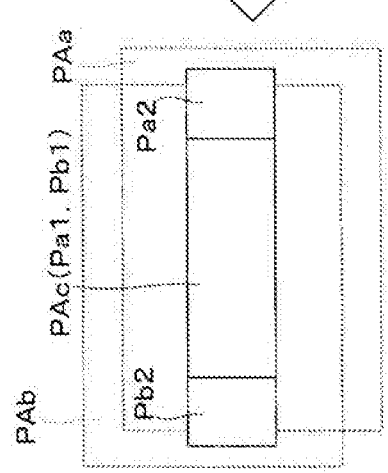
FIG. 11C is a diagram conceptually illustrating an entire video region recognized through binocular vision in the state illustrated in FIGS. 11A and 11B.
Figure 11F:
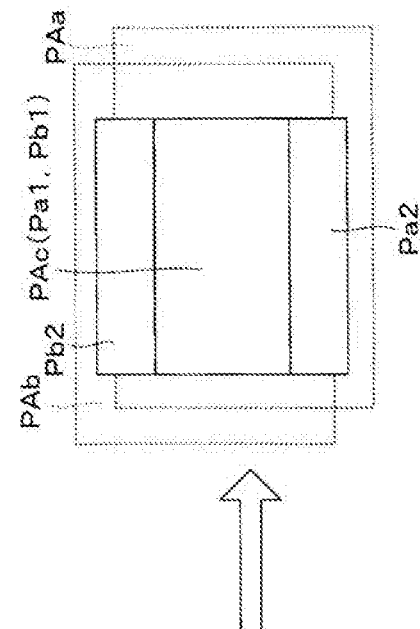
FIG. 11F is a diagram conceptually illustrating an entire video region recognized through binocular vision in the state illustrated in FIGS. 11D and 11E.

In the foregoing description, resizing or position changing of the common display area and the extended display area are considered to be performed, for example, according to content to be displayed or setting by a user. Specifically, as exemplified in FIGS. 11A to 11F, in the video regions PAa and PAb corresponding to virtual images recognized with the right and left eyes, the sizes, shapes, and disposition of the first video region Pa1 and the second video region Pa2 of the video region PAa or the first video region Pb1 and the second video region Pb2 of the video region PAb may be changed. That is, a form can be considered in which a first display state of display in which the second video regions Pa2 and Pb2 are provided to be extended to the left and right side of the first video region PAc in which the first video regions Pa1 and Pb1 are overlapped to be recognized, as indicated as one recognition state in FIGS. 11A, 11B, and 11C, is changed to a second display state of display in which the second video regions Pa2 and Pb2 are provided to be extended to the upper and lower sides of the first video region PAc, as indicated as another recognition state in FIGS. 11D, 11E, and 11F. At this time, as illustrated in FIGS. 11C and 11F, while the first video region PAc (Pa1 and Pb1) is set in a region overlapping the left and right video regions PAa and PAb, the second video region Pa2 may include a range deviated from the video region PAb within the range of the video region PAa and the second video region Pb2 may be extended to include a range deviated from the video region PAa within the video region PAb.

Figure 12:
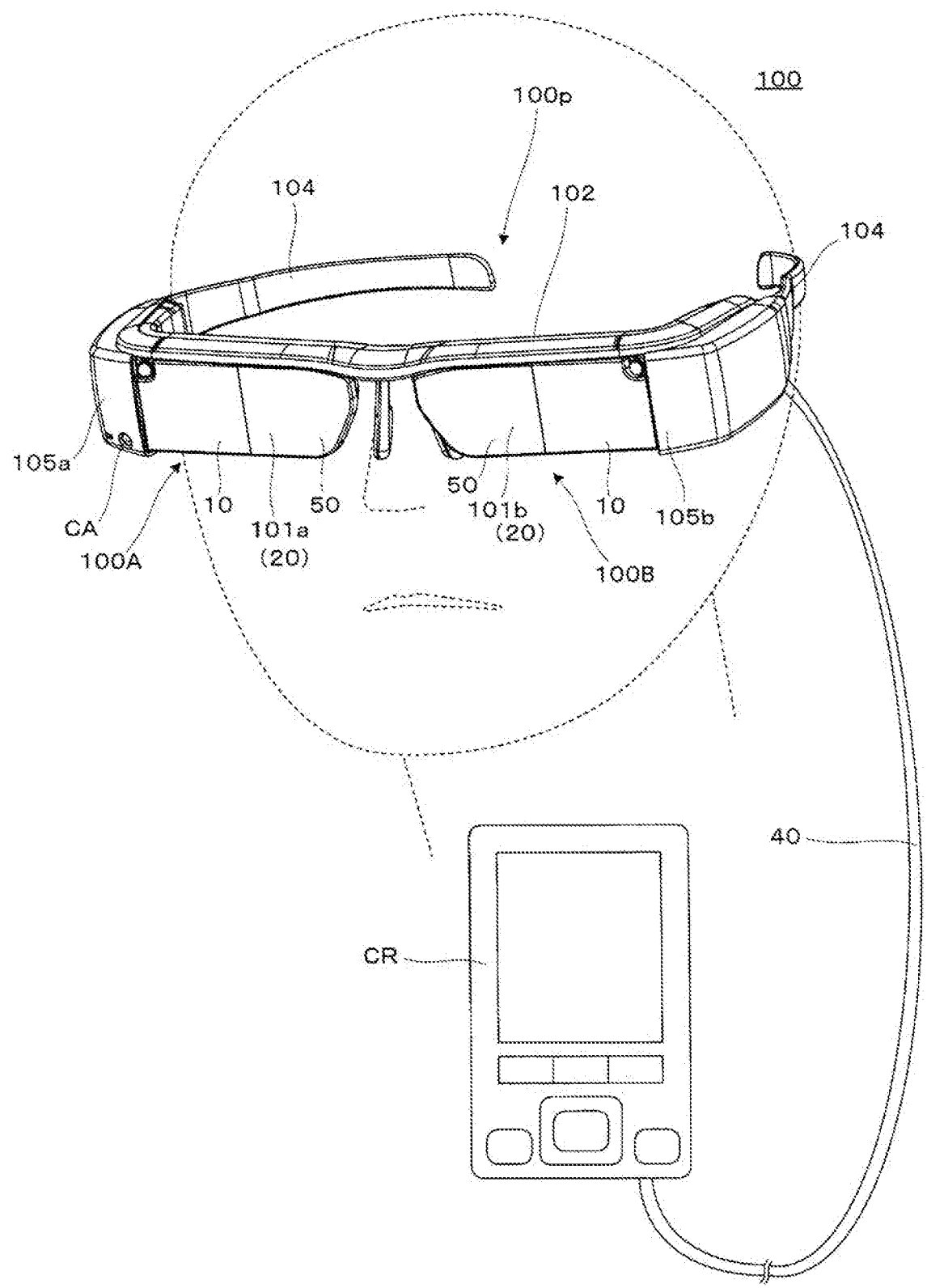
FIG. 12 is a diagram illustrating another example of the head-mounted display device.

In a case in which the image display is performed in the foregoing various forms, operation control of the image display is also important. Accordingly, an example of control of a display operation in a head-mounted display device will be described below with reference to FIG. 12 and the like. FIG. 12 is a diagram illustrating an example of a head-mounted display device according to an embodiment and is a diagram corresponding to FIG. 1. That is, an optical system of a head-mounted display device 100 in FIG. 12 has the same structure has the head-mounted display device 100 illustrated in FIG. 1. A control device CR which is omitted in the head-mounted display device 100 exemplified in FIG. 1 is added to describe a control operation. In FIG. 12, the control device CR is connected to a body section of a device having a glasses shape by a cable (connection unit) 40. As illustrated in FIG. 12, here, a body section of the device having the glasses shape which is formed as the head-mounted display device 100 in FIG. 1, that is a portion other than the control device CR and the cable 40, is referred to as a body section 100p to facilitate discrimination. In other words, the head-mounted display device 100 illustrated in FIG. 12 includes the body section 100p on which an optical system is mounted and which enables an observer to recognize an image, the control device CR that transmits a video signal and various other signals to the body section 100p and performs various control operations, and the cable 40 that connects the body section 100p to the control device CR. The structure and the like of the body section 100p have been described with reference to FIG. 1 and the like, and thus the description of each unit will be omitted. Although not described in FIG. 1, a camera CA is mounted near the first display device 100A in the body section 100p or any of various sensors can be installed, as exemplified in the drawing, in addition to the control device CR (the details will be described below with reference to FIG. 13 and the like).

In the head-mounted display device 100, the control device CR is configured to include a CPU performing various calculation processes, a storage device (storage unit), and an input device. The control device CR includes a touch panel or a button as the input device and also functions as a controller receiving instructions of various operations from an observer. The control device CR performs various calculation processes and transmits various signals such as a video signal to project a desired video in the head-mounted display device 100 to the body section 100p (in particular, the image display devices 80R and 80L illustrated in FIGS. 2A to 2E and the like). From another viewpoint, the body section 100p can also be said to function as a display device that performs a display operation according to an instruction from the control device CR.

Hereinafter, particularly, control of a display operation in the control of the head-mounted display device 100 will be described with reference to FIG. 13.

Figure 13:
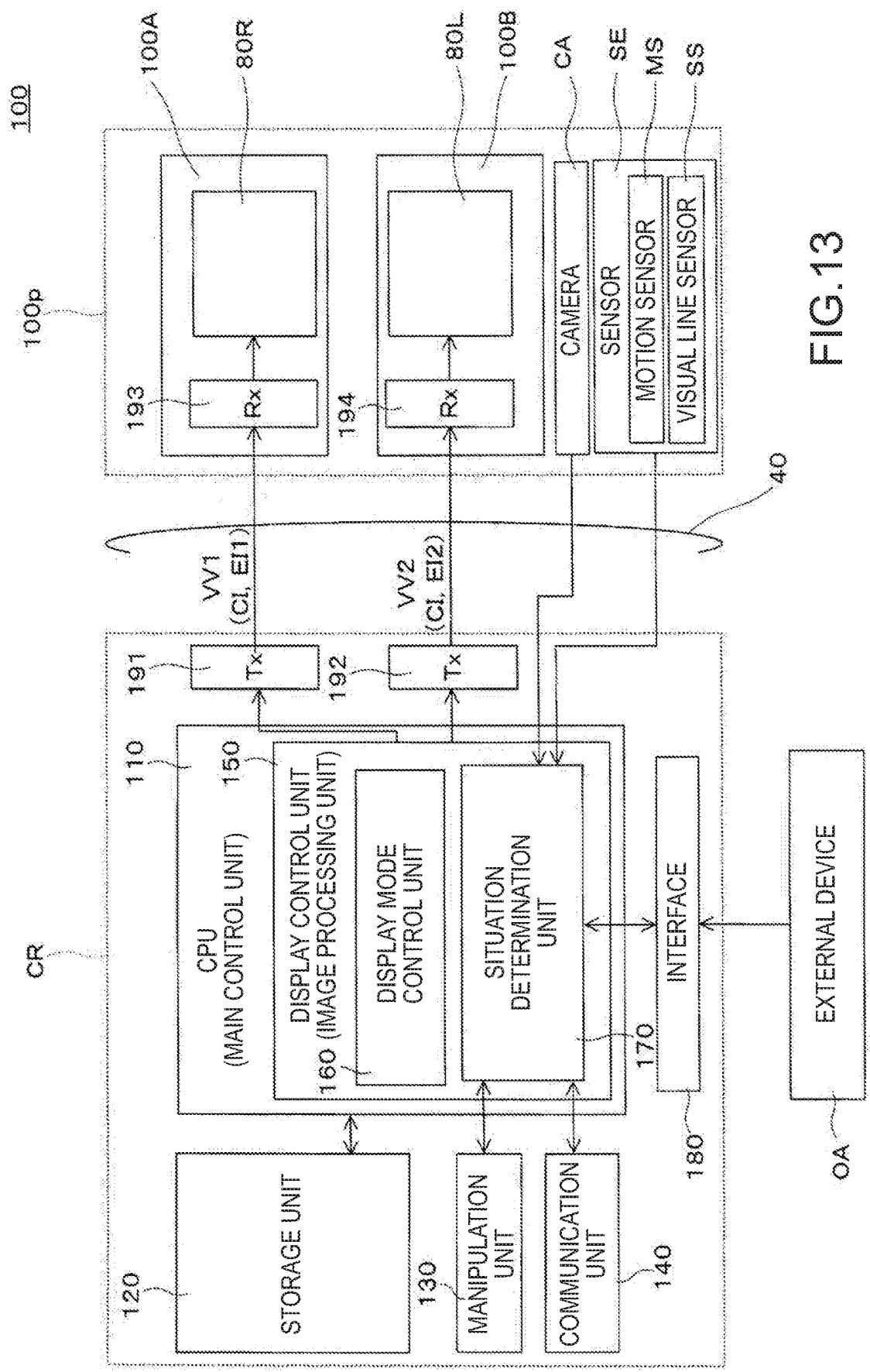
FIG. 13 is a block diagram illustrating control of the head-mounted display device.

FIG. 13 is a block diagram illustrating an example of the configuration to describe the control of the head-mounted display device 100 illustrated in FIG. 12. As illustrated in the drawing, here, various signals (in particular, a video signal) are transmitted from the control device CR to the body section 100p. In the body section 100p, various sensors SE are installed inside the device in addition to the camera CA. As the various sensors SE, for example, a motion sensor MS that is configured with a gyro sensor or the like and detects acceleration or the like to ascertain a posture or a motion of an observer and a visual line sensor SS which is a visual line detection unit can be considered to be provided. Various kinds of information acquired from the sensor are transmitted from the body section 100p to the control device CR.

Hereinafter, the configuration of the control device CR will be described in detail. In the head-mounted display device 100, the control device CR includes a CPU (main control unit) 110, a storage unit 120, a manipulation unit 130, a communication unit 140, an interface 180, and transmission units (Tx) 191 and 192.

Figure 14:
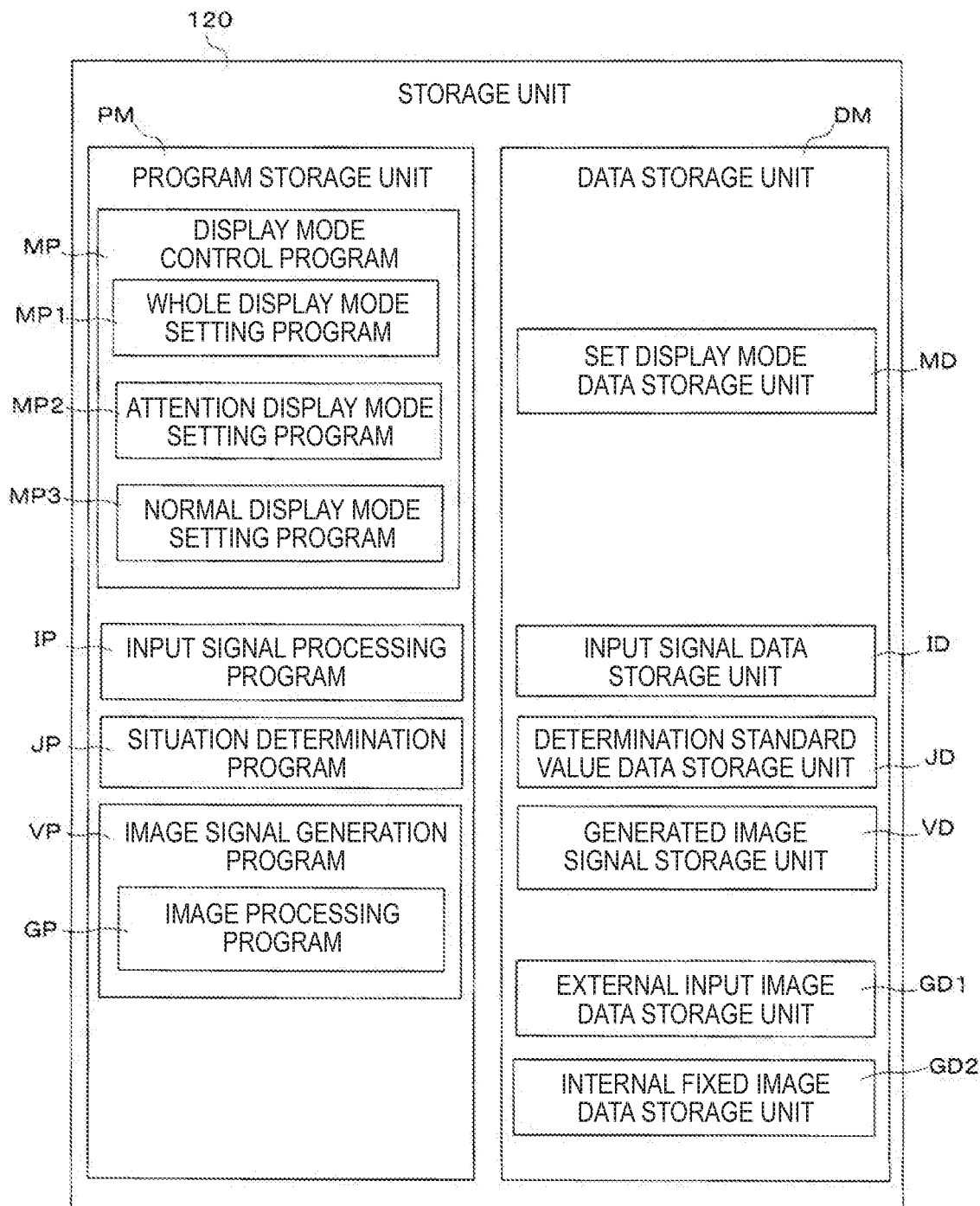
FIG. 14 is a block diagram illustrating a storage unit.

The storage unit 120 is configured with a ROM, a RAM, or the like and stores various computer programs or various kinds data (see FIG. 14). The CPU 110 functions as an operating system (OS) 150, an image processing unit, a display control unit, an input signal processing unit, and the like by reading a computer program or data from the storage unit 120. That is, the CPU 110 performs various calculation processes to function as a main control unit that governs all of the control of the head-mounted display device 100.

The manipulation unit 130 is an external input reception device (input device) manipulated by an observer or a user. The manipulation unit 130 is configured with, for example, a decision key, a display switch key, a track pad, a luminance switch key, a direction key, a menu key, or the like and acquires a signal according to a manipulation input by an observer or a user.

The communication unit 140 performs wireless communication with another device using electromagnetic waves. For example, the communication unit 140 performs wireless communication with another device in conformity to a predetermined wireless communication standard such as a wireless LAN, Bluetooth (registered trademark), or ZigBee (registered trademark).

The interface 180 performs connection to any of various external devices OA (for example, a personal computer, a mobile phone terminal, a game terminal, and the like) which is a supply source of content data such as an image (a still image or a moving image) or audio. As the interface 180, for example, a USB interface, a memory card interface, or a wireless LAN interface can be adopted.

The transmission units 191 and 192 transmit various kinds of data including video signals generated by the CPU 110 to the first and second display devices 100A and 100B included in the body section 100p, respectively. That is, the transmission units 191 and 192 function as transceivers for serial transmission between the control device CR and the first and second display devices 100A and 100B. A video signal (image data) transmitted through the transmission unit 191 is referred to as "right-eye image data" and a video signal (image data) transmitted through the transmission unit 192 is referred to as "left-eye image data".

Hereinafter, a process in the body section 100p in the head-mounted display device 100 illustrated in FIG. 13 will be described. As illustrated in the drawing, here, the image display devices 80R and 80L each include reception units (Rx) 193 and 194 that receive signals from the control device CR to perform image display in the display devices 100A and 100B of the body section 100p. That is, the reception units 193 and 194 function as receivers for serial transmission between the control device CR and the first and second display devices 100A and 100B. The image display devices 80R and 80L perform image forming based on right-eye image data and left-eye image data received by the reception units (Rx) 193 and 194.

In a case in which the CPU 110 in the control device CR functions as the display control unit (or an image processing unit) 150 in the foregoing configuration, the display control unit 150 acquires an image signal included in content input via the interface 180 and generates image data (right-eye image data and left-eye image data) along with various signals such as a synchronization signal based on the acquired image signal. The display control unit 150 supplies the generated signals as video signals for controlling a display operation of the head-mounted display device 100 to the first and second display devices 100A and 100B (the first and second display units) included in the body section 100p. That is, the CPU 110 controls the image display by transmitting the generated video signals to the reception units 193 and 194 via the transmission units 191 and 192.

Here, the display control unit 150 generates signals including common image information CI for the first and second common display areas and first extension image information EI1 and second extension image information EI2 for the first and second extended display areas which are pieces of extension image information for the extended display areas as the transmitted video signals (image data). That is, the display control unit 150 generates, as the right-eye image data, a video signal VV1 including the common image information CI which is image data corresponding to the first common display area in which the image display for recognition with the right eye is performed in the common display area and the first extension image information EI1 which is image data corresponding to the first extended display area in which the image display for recognition with the right eye is performed in the extended display area, and then transmit the video signal VV1 to the first display device 100A via the transmission unit 191. Similarly, the display control unit 150 generates, as the left-eye image data, a video signal VV2 including the common image information CI which is image data corresponding to the second common display area in which the image display for recognition with the left eye is performed in the common display area and second extension image information EI2 which is image data corresponding to the second extended display area in which the image display for recognition with the left eye is performed in the extended display area, and then transmit the video signal VV2 to the second display device 100B via the transmission unit 192. For example, in a case in which there is only one of the first and second extended display areas as the extended display area (see FIGS. 9A to 9F), there is only corresponding one extension image information between the first extension image information EI1 and the second extension image information EI2. That is, there is only one kind of extension image information for the extended display area.

Here, the display control unit 150 according to the embodiment further includes a display mode control unit 160 (or functions as the display mode control unit 160) that adjusts the common image information, the first extension image information EI1, and the second extension image information EI2 and can switch between a plurality of display modes with different image display forms in the first and second common display areas and the first and second extended display areas.

Here, as examples of the plurality of different display modes which can be set by the display mode control unit 160, the display mode control unit 160 is assumed to be able to select a whole display mode in which a difference in brightness to which presence or absence of overlapping between the first and second common display areas and the extended display area is added, that is, a difference in apparent brightness in the observer, is suppressed to be displayed, an attention display mode in which the difference in the brightness to which the presence or absence of the overlapping between the first and second common display areas and the extended display area is added, that is, a difference in apparent brightness in the observer, is applied to be displayed, and a normal display mode in which other normal display is performed. These modes are merely examples. For example, a display mode may be further included in addition to the three modes.

The display control unit 150 includes a situation determination unit 170 (or functions as the situation determination unit 170) which is a determination unit determining a mode to be selected in the display mode control unit 160. The display control unit 150 receives an information input from the outside and decides a mode to be set in the display mode control unit 160 by determining the common image information and the extension image information based on the received information.

Hereinafter, an operation for display control of the display control unit 150 including the display mode control unit 160 and the situation determination unit 170 will be described with reference to FIGS. 13 and 14 and the like. FIG. 14 is a block diagram illustrating an example of the configuration of the storage unit 120. As illustrated in the drawing, the storage unit 120 is configured to include a program storage unit PM that has a program region to store various programs and a data storage unit DM that has a data region to store various kinds of data.

Of the constitute elements of the storage unit 120, the program storage unit PM has a display mode control program MP for switching (setting) of the display mode in the display mode control unit 160, an input signal processing program IP for processing various input signals, a situation determination program JP for determining a video signal to be generated based on information received from the outside in the situation determination unit 170, and a video signal generation program VP for generating a video signal.

The display mode control program MP is configured as a program for generating each image signal in setting of each display mode of the plurality of display modes in order for the CPU 110 (or the display control unit 150) to function as the above-described display mode control unit 160. Here, as described above, the whole display mode, the attention display mode, and the normal display mode are selectable. Thus, to correspond to the selection of the mode, the display mode control program MP is assumed to include a whole display mode setting program MP1, an attention display mode setting program MP2, and a normal display mode setting program MP3. That is, the CPU 110 (or the display control unit 150) appropriately selects one of the three modes and reads and executes a corresponding display mode setting program to function as the display mode control unit 160.

The input signal processing program IP is a program for processing various input signals input from the outside of the CPU 110. Here, targets of the various input signals are not only input signals from the eternal device OA via the manipulation unit 130, the communication unit 140, or the interface 180 but also input signals (information) from the camera CA or the sensor SE annexed to the body section 100*p*. That is, the CPU 110 functions as an input signal processing unit by reading and appropriately executing the input signal processing program IP.

The situation determination program JP is a program for determining a video signal to be generated based on various kinds of information processed by the input signal processing program IP received from the outside in order for the CPU 110 (or the display control unit 150) to function as the above-described situation determination unit 170. Specifically, for example, it is analyzed whether video content of an image signal from the external device OA and received via the interface 180 is content regarding a 3D video or a movie, a screen such as a PC working screen, or a normal attention video or the screen includes a time, attention information, mail reception, an icon, and a toolbar which are normally unseen. Further, it is decided (determined) whether each piece of content or a part of the content is set to be as common image information or extension image information. That is, the CPU 110 serving as the display control unit 150 discriminates video content to be attended from video content other than the video content to be attended among pieces of video content of image display to be input and recognized. Thus, for example, the display control unit 150 (the CPU 110) can generate a video signal so that the video content to be attended is set as the common image information and the video content other than the video content to be attended is set as the extension image information. The CPU 110 serving as the situation determination unit 170 can also detect an external environment of an observer or an external environment such as a visual line or a posture of an observer based on, for example, an input signal from the camera CA or the sensor SE and decides a display form based on the external environment. In brief, the situation determination unit 170 determines, for example, one display mode to be selected among the foregoing three display modes. In addition, for example, when an observer appropriately manipulates the manipulation unit 130, the situation determination unit 170 determines that the display operation is performed according to an input signal in a case in which the input signal is given in response to an instruction to set one display mode to be selected among the three display modes in the manipulation unit 130. That is, the CPU 110 (or the display control unit 150) functions as the situation determination unit 170 by reading and appropriately executing the situation determination program JP.

The video signal generation program VP is a program for causing the CPU 110 to function as the display control unit 150, is configured as a program group for performing various processes to generate video signals and includes, for example, an image processing program GP to perform various kinds of image processing. The CPU 110 functions as the display control unit 150 that generates a video signal by reading and appropriately executing the video signal generation program VP based on reception of an input signal in each of the above-described programs or a reception process or a result of situation determination of an external environment or the like and the selected display mode.

Of the constituent elements of the storage unit 120, the data storage unit DM includes a set display mode data storage unit MD that stores data regarding the display mode selected (set) from the display mode control programs MP, an input signal data storage unit ID that stores processing target data or processed data in the input signal processing program IP, and a determination standard value data storage unit JD that stores data serving as various determination standards in the situation determination program JP. The data storage unit DM further includes, for example, an external input image data storage unit GD1 that stores data regarding image data among external input signals and an internal fixed image data storage unit GD2 that stores image data originally included inside as fixed video content. As data stored in the image data storage units GD1 and GD2, for example, image data that is fixedly displayed at the time of startup, image data for alert display, and icon image data (particularly, data called many times) are assumed.

Here, the display control in the setting of the whole display mode and the display control in the setting of the attention display mode will be described in more detail. First, FIGS. 15A to 15C are diagrams illustrating an example of adjustment of luminance for the display control in the setting of the whole display mode. FIG. 15D is a diagram illustrating an example of adjustment of luminance for the display control in the setting of the attention display mode. Here, to facilitate the description, relative ratios (%) of maximum luminance between the first video regions Pa1 and Pb1 and the second video regions Pa2 and Pb2 are used.

First, FIGS. 15A and 15B are diagrams conceptually illustrating an example of the luminance in a pair of right and left video regions in the setting of the whole display mode. As illustrated in the drawing, while the luminance of the second video regions Pa2 and Pb2 corresponding to the first and second extended display areas which are the extended display areas in the video regions PAa and PAb is set to 100%, the luminance of the first video regions Pa1 and Pb1 corresponding to the first and second common display areas is set to 50%. That is, in a case in which each video is seen with one eye, the first video regions Pa1 and Pb1 are seen to be darker than the second video regions Pa2 and Pb2. As described above, in a case in which the whole display mode is set, the CPU 110 (or the display control unit 150) performs image control to suppress the luminance of the first and second common display areas more than the luminance of the extended display areas. The brightness of the entire display is balanced in addition to a feeling of the brightness viewed due to the overlapping by suppressing the luminance of the first and second common display areas more than the luminance of the extended display areas, and thus the observer can be allowed to recognize the areas just as the areas is one image extended in an integrated manner as a whole. In particular, in the foregoing case, the luminance of the first common display area and the luminance of the second common display area are half of the luminance of the extended display areas together. Thus, as conceptually illustrated in FIG. 15C, the apparent brightness of the display image (the first video region PAc) of the first and second common display areas recognized to be overlapped is the same as the brightness of the display image (the second video regions Pa2 and Pb2) of the extended display areas, and thus the observer can be allowed to recognize the areas just as the areas are one image extended in an integrated manner as a whole. That is, the first video region PAc which is recognized to be overlapped consequently and the second video regions Pa2 and Pb2 which are not overlapped are displayed in such a manner that a difference in the apparent brightness in addition to presence or absence of the overlapping is suppressed. That is, the observer can recognize a video without a sense of discomfort such as, particularly, brightness or color irregularity when the observer comprehends the connected first video region PAc and second video regions Pa2 and Pb2 as one large video region as a whole.

FIG. 15D is a diagram corresponding to FIG. 15C and conceptually illustrates a form of the luminance in the setting of the attention display mode. In the example illustrated in the drawing, unlike the foregoing case, the luminance of the first and second common display areas and the luminance of the extended display areas are set to the same luminance of 100%. In this case, in the first video region PAc which is recognized to be overlapped consequently and the second video regions Pa2 and Pb2 which are not overlapped, a difference in the apparent brightness to which presence or absence of the overlapping is added as whole is displayed. As described above, in the attention display mode, the luminance differs between the first and second common display areas and the extended display areas. For example, when the first and second common display areas are further brightened, the visual line of the observer can be focused on (attended to) a range of the image display corresponding to the first and second common display areas. That is, the observer can recognize the video brighter in the middle while comprehending all the connected first video region PAc and second video regions Pa2 and Pb2 as one large video region. In the foregoing example, the luminance of the first video regions Pa1 and Pb1 and the luminance of the second video regions Pa2 and Pb2 are not different as 100%. However, for example, it can be considered that the luminance of the first video region Pa1 and the first video region Pb1 is set to 70% and the luminance of the second video regions Pa2 and Pb2 is set to 100%. In this way, it is considered that the observer feels the first video region PAc (the first video regions Pa1 and Pb1) recognized to be overlapped brighter than the second video regions Pa2 and Pb2.

Hereinafter, an example of a process of a display operation using the head-mounted display device 100 according to the embodiment will be described with reference to the flowchart of FIG. 16 and the like. When power is fed to the head-mounted display device 100 (not illustrated) and the head-mounted display device 100 is activated to start the process of the display operation, the CPU 110 serving as the display control unit 150 first performs a situation determination process to decide a display form (step S101). That is, the CPU 110 functions as the situation determination unit 170 by reading the situation determination program JP stored in the storage unit 120. As described above, the situation determination unit 170 performs distribution to image signals based on various conditions. Here, to facilitate the description, it is assumed that one display mode is selected among the foregoing three display modes (the whole display mode, the attention display mode, and the normal display mode) as the result of the determination of the situation determination unit 170 and a video signal is generated based on the selected mode. That is, in step S101, the CPU 110 appropriately selects one program from the programs of the display mode control programs MP. Next, the CPU 110 serving as the situation determination unit 170 confirms whether the situation is changed (step S102). In a case in which the situation is changed (Yes in step S102), the process returns to step S101. The CPU 110 serving as the situation determination unit 170 determines the situation determination again and decides the display form, that is, determines the display mode to be selected. Conversely, when the situation is not changed instep S102 (No in step S102), the display mode setting program selected in step S102 is read and the video signal generation program VP is appropriately read. Then, the video signals VV1 and VV2 including the common image information CI for the first and second common display areas and the pieces of extension image information EI1 and EI2 for the extended display areas are generated (step S103) and the generated video signals VV1 and VV2 are transmitted (step S104). After the video signals are transmitted in step S104, the CPU 110 confirms whether an instruction signal indicting end of the display operation by the head-mounted display device 100 is received (step S105). When the CPU 110 confirms that the instruction signal indicating the end of the display operation is received (Yes in step S105), the CPU 110 ends the display operation. Conversely, when the CPU 110 does not confirm that the instruction signal indicating the end of the display operation is received (No in step S105), the CPU 110 serving as the situation determination unit 170 reconfirms whether the situation is changed in step S102. That is, the video signal is continuously generated and transmitted based on the set display mode as long as the situation is not changed or the display operation does not end.

Figure 17:
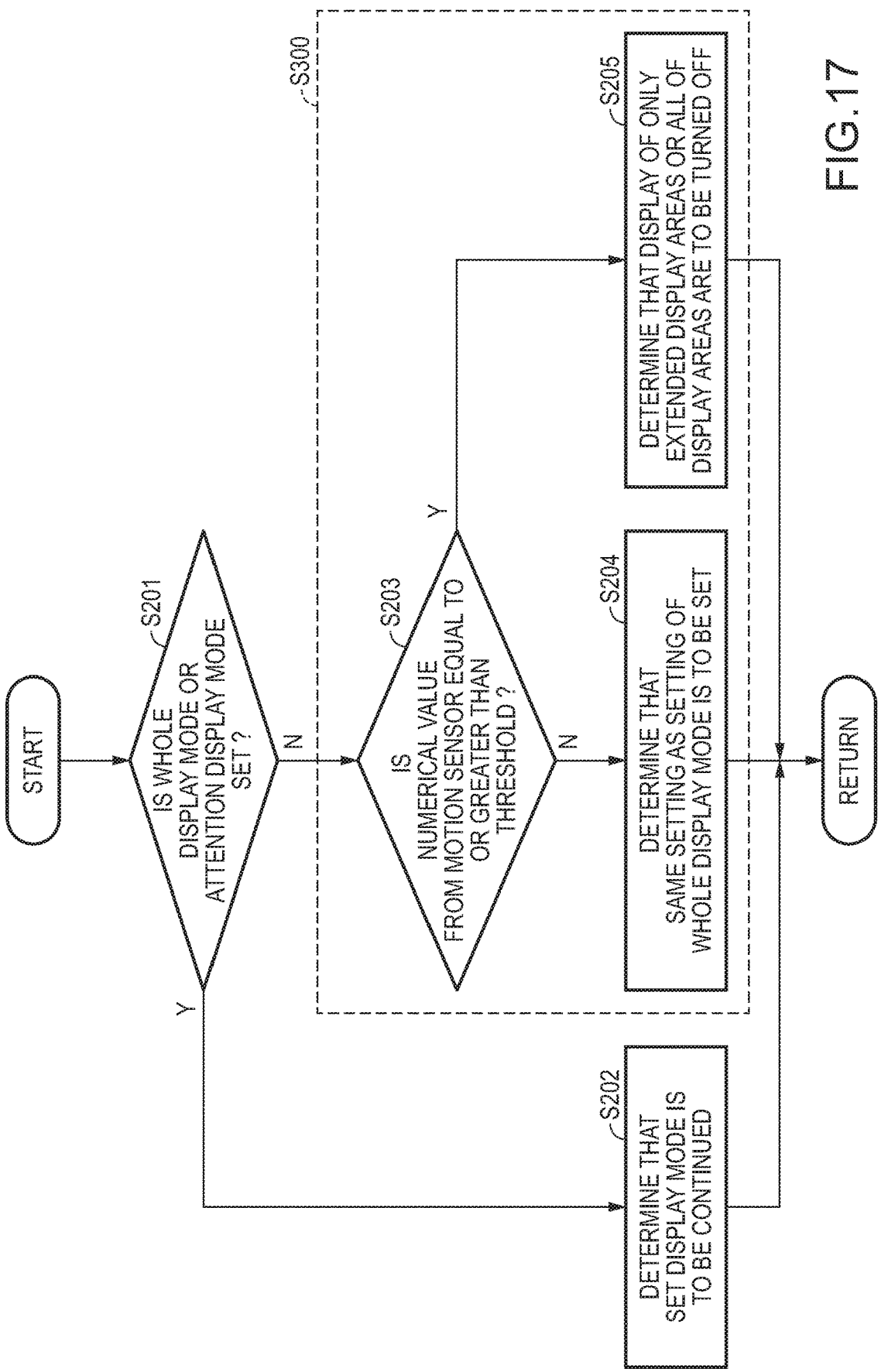
FIG. 17 is a flowchart illustrating an example of situation determination.

FIG. 17 is a flowchart illustrating an example of process content in the determination process in the foregoing step S101. Here, as described above, an example in which one display mode is selected from three display modes (the whole display mode, the attention display mode, and the normal display mode) in step S101 will be described. First, the CPU 110 serving as the situation determination unit 170 confirms whether the whole display mode or the attention display mode is set among the three display modes according to a certain method (step S201). Here, as a case in which the whole display mode or the attention display mode is set in step S201, for example, it can be considered that video content from external input data is known to be content regarding a 3D video or a movie and the attention display mode is accordingly set automatically. As another example, it can also be considered that a wallpaper is known to be displayed despite a PC work screen and the whole display mode is accordingly set automatically so that a difference in the brightness of the wallpaper does not occur between the middle side (a common image side) and the peripheral side (an extended image side). In addition, it can also be considered that the display mode is forcibly set by a signal instruction through the manipulation unit 130 (a signal instruction through a manual manipulation) or a signal instruction through the communication unit 140 (a signal instruction through a remote manipulation).

In a case in which the whole display mode or the attention display mode is set in step S201 (Yes in step S201), the CPU 110 determines that the set display mode is maintained (step S202) and ends the process of step S101. Then, the process transitions to processes of step S102 and subsequent steps of FIG. 16.

Conversely, in a case in which it is determined that neither whole display mode nor the attention display mode is set in step S201 (No in step S201), the CPU 110 performs an operation according to the normal display mode (step S300). Various operations according to the normal display mode are considered. Here, for example, the CPU 110 serving as the situation determination unit 170 first conforms whether a numerical number from the motion sensor MS is equal to or greater than a threshold (step S203). Specifically, the CPU 110 reads data from the motion sensor MS of the sensors SE annexed to the body section 100*p* from the input signal data storage unit ID and reads a corresponding threshold (for example, a threshold of acceleration or inclination) from the determination standard value data storage unit JD to compare the data to the threshold. In a case in which the numerical value is consequently less than the threshold (No in step S203), it is determined that a posture or a state of the observer is a state in which there is no problem in observation by the head-mounted display device 100, and thus a normal display operation is performed (step S204). Here, for example, it is assumed that the image display based on the same setting as the setting of the whole display mode is performed in step S204. Conversely, when the numerical value is equal to or greater than the threshold in step S203 (Yes in step S203), it is determined that there is a possibility that the posture or the state of the observer is a state in which there is a problem in the observation by the head-mounted display device 100, it is determined that the display in the common display areas is stopped and the display of only the extended display areas is possible or it is determined that the display of all the areas including not only the common display areas but also the extended display areas is to be stopped (all areas are turned off) (step S205). The process of step S101 ends and the process transitions to the process of step S102 and the subsequent steps of FIG. 16. Whenever the setting of the display mode is changed as a result of the determination process of the foregoing step S101, the CPU 110 serving as the display mode control unit 160 rewrites data regarding the display mode stored in the set display mode storage unit MD and performs image processing (or signal generation) based on the display mode set based on the data.

Figure 16:
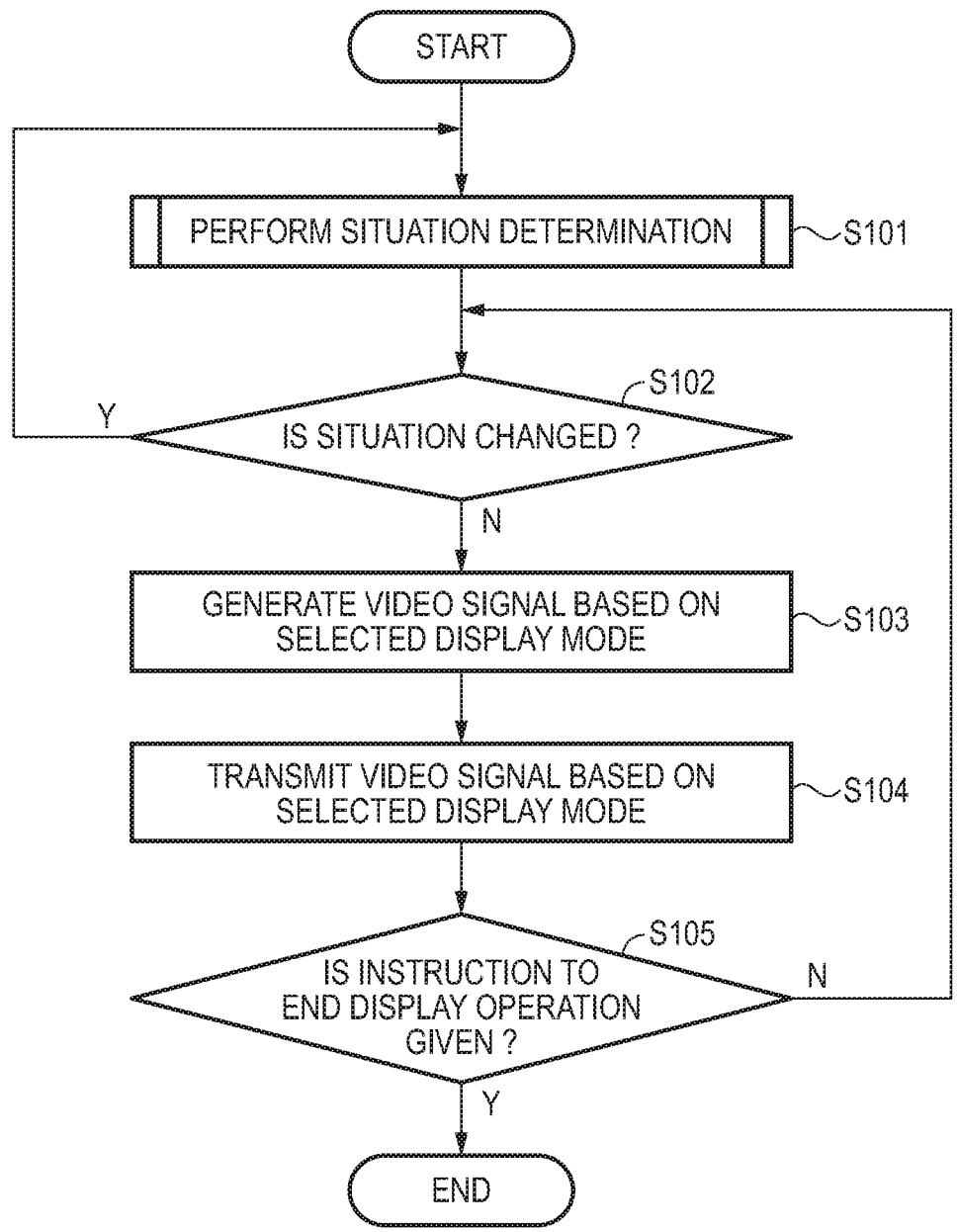
FIG. 16 is a flowchart illustrating an example of display control of the head-mounted display device.

In the case of the foregoing example illustrated in FIG. 17, the determination standard of whether the situation is changed in step S102 of FIG. 16 depends on, for example, an input signal related to switch of the display mode or a change in the numerical value detected by the motion sensor MS. The example illustrated in FIG. 16 and the like is merely an example and various forms of the example can be considered. For example, for the information from the sensor SE, it can also be considered that the situation of an external environment can be determined based on information from the camera CA or detection of a position using the communication unit 140 without limiting to the motion sensor MS. In regard to the camera CA, for example, walking, running, or riding a vehicle (car or the like) can be determined by reading a 2-dimensional code installed at a specific position and performing position detection or by setting position detection or detection of a movement speed using GPS or the like as a determination standard as a communication function. For example, in the case of the riding of a vehicle, it can also be considered that control is performed such that only the extended display areas can be displayed and only guidepost information can be supplied. For example, the spot indicated as step S300 in FIG. 17 can be handled by modifying the spot according to information or the like applied to the situation determination (changing the design of the normal display mode) or by newly setting the display modes, that is, appropriately embedding various programs. At this time, for example, various kinds of data stored in the determination standard value data storage unit JD may be appropriately added or changed. In the example of FIG. 17, some or all of the display areas are turned off in step S205 of step S300, but the invention is not limited thereto. It can also be considered that, for example, the common display area (the first video region PAc (Pa1 and Pb1)) can be set to an alert display state under a certain condition. It can also be considered that the sensor SE can be used variously. In addition to the foregoing description, for example, pulses or brain waves of the observer may be measured and a situation may be determined based on such a measurement result.

As described above, in the head-mounted display device 100 according to the embodiment, the first and second display devices 100A and 100B which are the first and second display units have the first and second common display areas in which the image display with the common content to the right and left eyes is performed, respectively. At least one of the first and second display devices 100A and 100B has the extended display area. The display control unit 150 generates the signal including the common image information for the first and second common display areas and the extension image information for the extended display areas so that various kinds of image display can be performed.

Hereinafter, a modification example of the control of the display operation according to the embodiment will be described with reference FIGS. 18A and 18B.

Figures 18A, 18B:
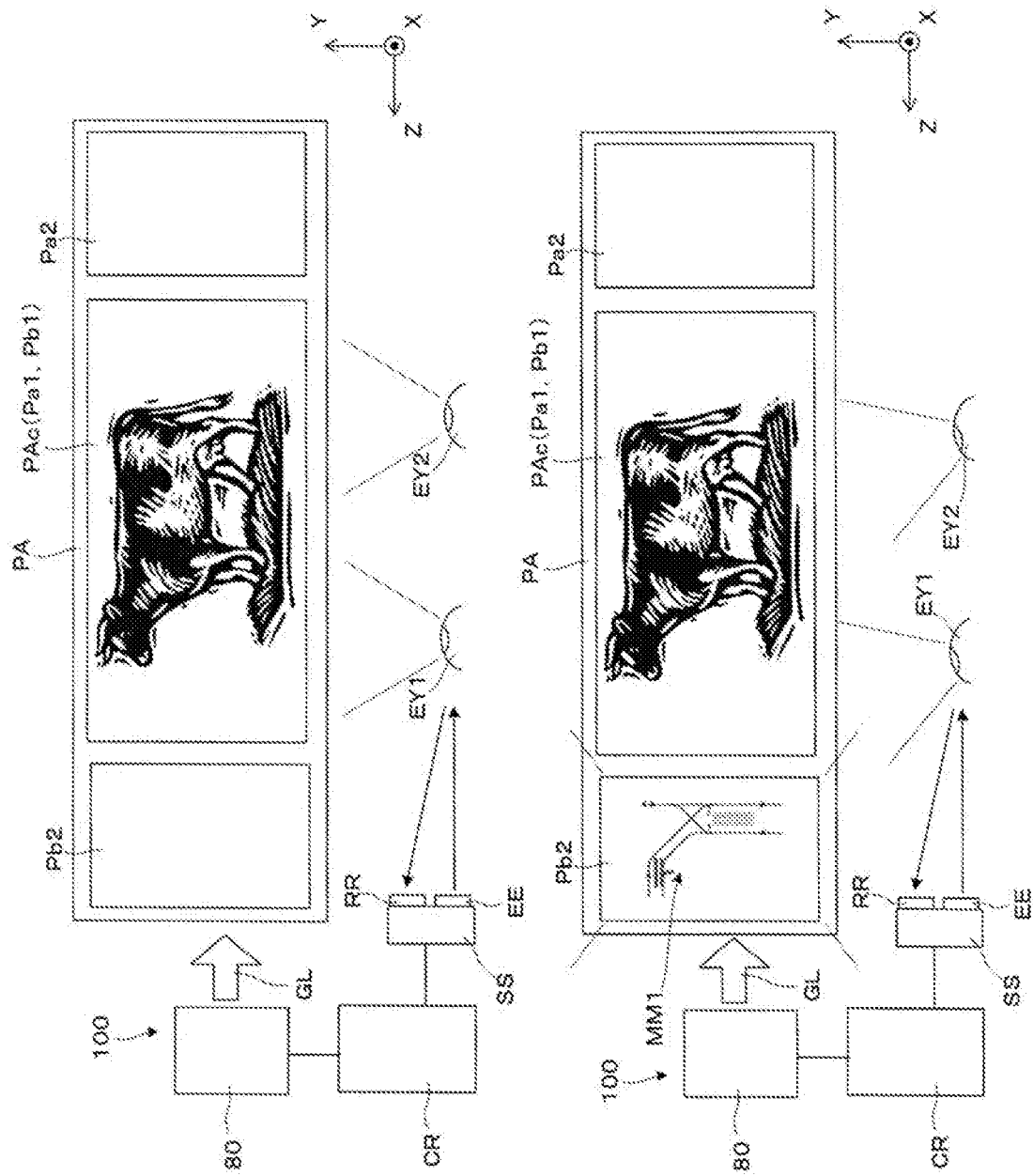
FIGS. 18A and 18B are diagrams illustrating a modification example of a display operation.

As illustrated in FIG. 18A and the like, according to the modification example, it is assumed that motions of the eyes EY1 and EY2 of the observer are ascertained by the visual line sensor SS which is a visual line detection unit included in the sensor SE and display control according to the motions is performed. The visual line sensor SS includes, for example, a light emission unit EE and a light reception unit RR. The visual line sensor SS is considered to function as a visual line detection unit in such a manner that week infrared light arrives at the eyes EY1 and EY2 from the light emission unit EE and reflected light from retinas and corneas is ascertained by the light reception unit RR to detect a visual line direction.

Hereinafter, a specific example of the display control will be described. First, as illustrated in FIG. 18A, image display is performed only in the first video region PAc (Pa1 and Pb1) in a case in which the eyes EY1 and EY2 of the observer are determined to be oriented in a front direction, that is, oriented to the first video region PAc (Pa1 and Pb1) corresponding to the common display area in the video region PA by the visual line sensor SS. On the other hand, as illustrated in FIG. 18B, image display (display of an image MM1) is performed in the second video region Pb2 in addition to the first video region PAc (Pa1 and Pb1) in a case in which the eyes EY1 and EY2 of the observer are determined to be oriented in a left direction, that is, oriented to the second video region Pb2 seen with only the left eye which is one eye corresponding to the extended display area in the video region PA by the visual line sensor SS. That is, the CPU 110 serving as the display control unit 150 can perform the display corresponding to motions of the eyes EY1 and EY2 of the observer by switching the display form according to the detection result of the visual line sensor SS. For example, compared to the foregoing description, the display form may be switched by switching a plurality of display modes such as the above-described attention display mode according to a detection result of the visual line sensor SS.

In the foregoing form, the content of the image display corresponding to the extended display areas is considered to be, for example, a time, attention information, mail reception, an icon, and a toolbar which are normally unseen.

Hereinafter, another modification example of the control of the display operation according to the embodiment will be described with reference to FIGS. 19A and 19B. First, FIG. 19A illustrates an image display state previous chronologically over time and FIG. 19B illustrates a display state after FIG. 19A is displayed and a predetermined time (for example, several seconds) elapses. In the modification example, the CPU 110 serving as the display control unit 150 first controls an image operation such that the display of the image MM1 performed in the second video region Pb2 corresponding to the extended display area ends in the second video region Pb2 after a predetermined time, as illustrated in FIG. 19A, and the display of the image MM1 with the same content as that the display is performed in the first video region PAc (Pa1 and Pb1) corresponding to the first and second common display areas, as illustrated in FIG. 19B. Whether the display form is changed from the state illustrated in FIG. 19A to the state illustrated in FIG. 19B may be determined under the condition that, for example, as illustrated in the drawing, motions of the eyes EY1 and EY2 of the observer are ascertained by the visual line sensor SS and it is determined that the eyes EY1 and EY2 continuously look at the image MM1 of the second video region Pb2 illustrated in FIG. 19A for a predetermined time or more. In this case, for example, in the state illustrated in FIG. 19A, the visual line (the directions of the eyes EY1 and EY2) of the observer oriented toward the second video region Pb2 corresponding to the extended display area can be changed to the first video region PAc (Pa1 and Pb1) corresponding to the first and second common display areas. Thus, for example, it is possible to suppress the attention to the extended display areas. When the display form is changed from the state illustrated in FIG. 19A to the state illustrated in FIG. 19B, for example, more detailed information may be displayed without limiting to the form in which the display of the image MM1 is the same. Specifically, at the time of display in the second video region Pb2, it can be considered that weather information regarding one week is displayed in more detail in a case in which an icon of today's weather is displayed in the first video region PAc (Pa1 and Pb1). As described above, the visual line is detected in the directions of both the eyes EY1 and EY2, but the invention is not limited thereto. For example, only an eye (one eye) for which an image is displayed may be set as a detection target and the one eye may be detected. As described above, in a case in which the display in the extended display area transitions to the common display area, an image (for example, an arrow) indicating that the display is moved may be displayed together in a short time.

Figure 20A:
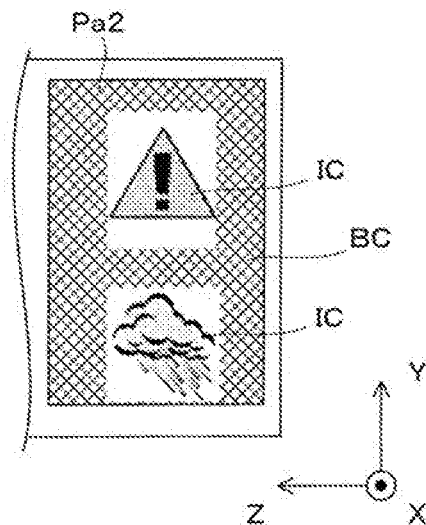
FIGS. 20A and 20B are diagrams illustrating still another modification example of the display operation.
Figure 20B:
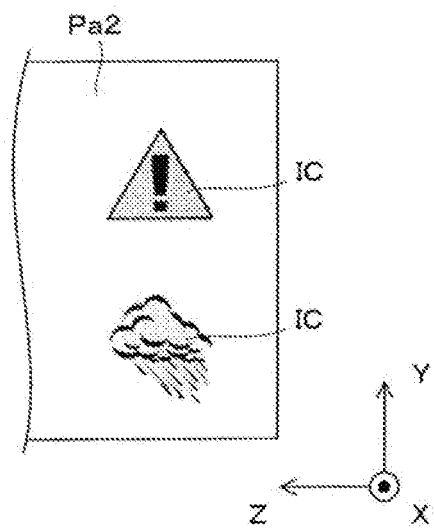

Hereinafter, still another modification example of the control of the display operation according to the embodiment will be described with reference to FIGS. 20A and 20B. FIG. 20A is a diagram illustrating a form of the second video region Pa2 seen with only the right eye which is one eye corresponding to the extended display area. FIG. 20B is a diagram illustrating a form of the display of the second video region Pa2. As illustrated in the drawings, here, as sub-information images in the second video region Pa2, images such as attention information and weather forecast are assumed to be displayed as, for example, icon images IC. That is, for example, by moving a cursor (not illustrated) on a screen of the icon images IC and performing a click operation, image display of content (the details of the attention information or the weather forecast) corresponding to the icon images IC is performed. On the other hand, an image of a video region other than the icon images IC in the second video region Pb2 is assumed to be a background image BC. In other words, the CPU 110 serving as the display control unit 150 performs control of the display operation on the background image BC and the icon images IC which are other images other than the background image BC in the second video region Pb2 corresponding to the extended display area. In the modification example, the CPU 110 performs display control such that the luminance of the background image BC in the extended display area is suppressed more than the other images. As a result, as illustrated in FIG. 20B, only the icon images IC can be viewed just as the icon images IC are displayed in the second video region Pb2 corresponding to the extended display area. In particular, in a case in which the image display devices 80R and 80L are configured as, for example, image display elements which are spontaneous elements such as organic EL elements, the luminance of the portion corresponding to the background image BC may be sufficiently reduced. Thus, in this case, in the head-mounted display device 100 which is a virtual display device capable of enabling an external world to be recognized or observed in a see-through manner, the observer can feel just as the icon images IC are displayed in midair. The invention is not limited to the icon images, but an image such as a banner may b displayed in the foregoing form in the second video region Pa2 (Pb2).

In the above-described attention display mode, as described above, the background image BC may be set such that the luminance is reduced or may be set with an inconspicuous color such as black or gray so that the observer can further focus on an image in the common display area desired to be attended.

Figure 21:
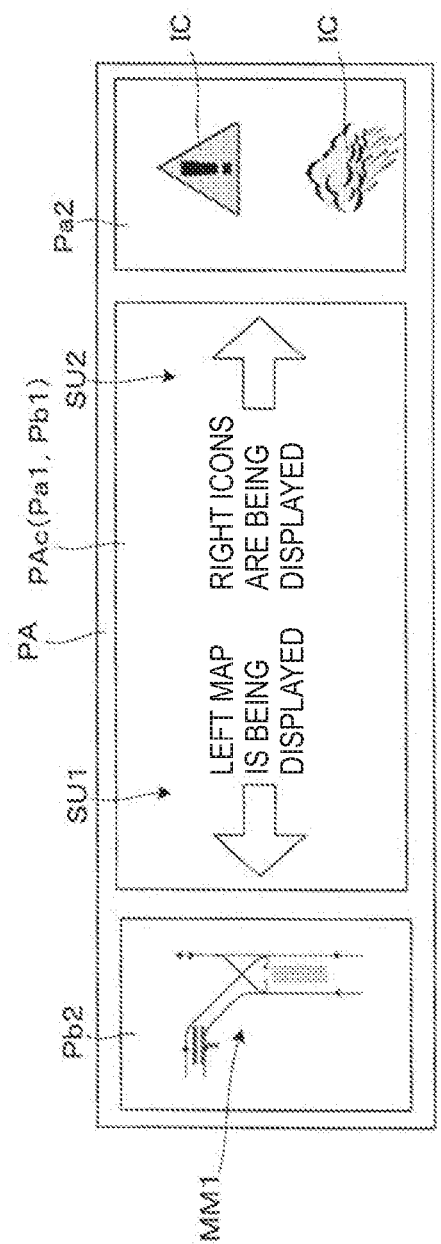
FIG. 21 is a diagram illustrating further still another modification example of the display operation.

Hereinafter, further still another modification example of the control of the display operation according to the embodiment will be described with reference to FIG. 21. As illustrated in FIG. 21, according to the modification example, in a case in which display of an image MM1 of navigation information (map information) or the icon images IC is performed in the second video regions Pa2 and Pb2 corresponding to the extended display areas, the CPU 110 serving as the display control unit 150 displays assistant images SU1 and SU2 indicating that the display is performed in the first video region PAc (Pa1 and Pb1) corresponding to the first and second common display areas. In this case, the observer can be prompted to recognize the image display corresponding to the extended display areas. The assistant images SU1 and SU2 can be considered variously. In addition to the illustrated letters or arrows, display by icons or the like can also be considered. The image sizes or positions of the assistant images SU1 and SU2 may be various. In the illustrated example, the assistant images are displayed to facilitate the description, but may be smaller in a recognizable range. The display positions can be considered variously. Further, blinking display or the like may be performed.

The invention is not limited to the foregoing embodiments, but may be modified in various forms within the scope of the invention without departing from the gist of the invention.

For example, as described above, the image display devices 80 (80R and 80L) are image display elements configured as for example, spontaneous elements such as organic EL elements. However, the image display devices 80 can also be configured to include, for example, an LCD which is a transmissive spatial light modulation device, an illumination device which is a backlight emitting illumination light to the LCD, and a driving control unit (not illustrated) controlling an operation. In this case, a video signal generated in the CPU 110 serving as the display control unit 150 is configured to include a backlight control signal and an LCD control signal (driving signal).

As described above, the control device CR is connected to the body section 100p by the cable 40, and thus the control device CR and the body section 100p are separately formed. However, for example, all or a part of the control device CR may be integrated with the body section 100p. Alternatively, the control device CR and the body section 100p may exchange information through wireless communication without intervention of the cable 40.

In the case of the foregoing form, when the video signals VV1 and VV2 are generated by the display control unit 150, the common image information CI or the pieces of extension image information EI1 and EI2 according to the display mode include the information regarding luminance or the information regarding a display range in which the image display is performed. However, it can be considered that information regarding resolution of an image displayed in addition to the information is included. For example, as in the case described with reference to FIGS. 18A and 18B, it can be considered that the display control is controlled such that resolution of only a display range attended at the time of orientation of a visual line is increased when the display form is switched according to a detection result of the visual line sensor SS. In this way, it is possible to suppress a calculation amount (process amount) in the image processing.

As described above, any of various devices can be used as the image display device 80. For example, the image display device can be configured using a reflective liquid crystal display device. A digital micro-mirror device or the like can also be used instead of a video display element formed as a liquid crystal device.

As described above, the half mirror layer of the second surface S12 is formed of, for example, a metal reflection film or a dielectric multiplayer, but may be substituted with a planar or curved hologram element.

As described above, the light-guiding members 10 and the like are arranged in the horizontal direction in which the eyes are lined. However, the light-guiding members 10 may be disposed to be arranged in the vertical direction. In this case, the light-guiding members 10 have a structure disposed not in series but in parallel.

As described above, only the form in which image light and external light are overlapped has been described. For example, the invention may also be applied to a head-mounted display device (or a virtual image display device) capable of making observation by switching a form in which only image light is emitted without being overlapped and a form in which only external light is emitted. The invention may also be applied to a so-called closed (non-see-through) head-mounted display device that enables only image light to be recognized without being overlapped.

The technology of the present invention may correspond to a so-called video see-through product configured to include a display and an imaging device.

Various programs that operate the above-described head-mounted display device (or a virtual image display device) may be stored in a storage medium capable of reading programs to a head head-mounted display device (or a virtual image display device).

The entire disclosure of Japanese Patent Application No.: 2016-041860, filed Mar. 4, 2016 and 2016-192987, filed Sep. 30, 2016 are expressly incorporated by reference herein.

What is claimed is:

1. A head-mounted display device comprising:
a first display and a second display that perform image display to correspond to left and right eyes, respectively; and
a display controller that transmits a video signal for controlling display operations of the first and second displays and controls the image display, wherein:
the first display and second display have first and second common display areas, respectively, in which image display with common content is performed, and
the first display and the second display have a first extended display area and a second extended display area, respectively, formed by extending the first and second common display areas, respectively,
the first extended display area and the second extended display area are configured to display different images,
the display controller generates a signal including common image information for the first and second common display areas and extension image information for the first and second extended display areas, as the video signal to be transmitted to the first and second displays, and in a case in which display is performed in the first and second extended display areas, the display controller displays an assistant image indicating that the display is performed in the first and second extended display areas in the first and second common display areas, respectively.

2. The head-mounted display device according to claim 1, wherein
the first and second displays perform, in the first and second extended display areas, image display with different content from display in the first and second common display areas, respectively.

3. The head-mounted display device according to claim 1, wherein
the first and second displays form a stereoscopic image in the image display in the first and second common display areas.

4. The head-mounted display device according to claim 1, wherein
the first and second displays perform image display including a range of at least a discrimination visual field as a recognition range formed by the first and second common display areas.

5. The head-mounted display device according to claim 4, wherein
the first and second displays perform image display including a range of an angle of view of 10° as a recognition range formed by the first and second common display areas.

6. The head-mounted display device according to claim 1, wherein
the first and second displays perform image display for recognizing the first and second common display areas to be overlapped using center of optical axes of left and right eyes as standards.

7. The head-mounted display device according to claim 1, wherein
the first and second displays include first and second image display elements producing video light corresponding to left and right eyes.

8. The head-mounted display device according to claim 7, wherein
the first and second image display elements each have one display panel region, and the display panel region is divided according to a first region in which the video light of the first and second common display areas is produced and a second region in which the video light of the extended display area is produced.

9. The head-mounted display device according to claim 7, wherein
the first and second image display elements each have an individual display panel region according to the first and second common display areas and the extended display area.

10. The head-mounted display device according to claim 7, wherein
the first and second displays shift centers of the display panel regions of the first and second image display elements from a central optical axis.

11. The head-mounted display device according to claim 1, wherein
the first and second extended display areas are continuously adjacent to an outer edge of the first common display area and the second common display area, respectively.

12. The head-mounted display device according to claim 1, wherein
the display controller includes a display mode controller that adjusts the common image information and the extension image information and is able to switch between a plurality of display modes with different image display forms in the first and second common display areas and the first and second extended display areas.

13. The head-mounted display device according to claim 12, wherein
in the display mode controller, the plurality of display modes include a whole display mode in which a difference in brightness to which presence or absence of overlapping between the first and second common display areas and the first and second extended display areas is added is suppressed to be displayed and an attention display mode in which the difference in the brightness to which the presence or absence of the overlapping between the first and second common display areas and the first and second extended display areas is applied to be displayed.

14. The head-mounted display device according to claim 13, wherein
in a case in which the display mode controller sets the whole display mode, the display controller performs display control such that luminance of the first and second common display areas is suppressed more than luminance of the first and second extended display areas.

15. The head-mounted display device according to claim 1, further comprising:
a visual line sensor that detects a visual line direction of an observer, wherein
the display controller switches a display form according to a detection result of the visual line sensor.

16. The head-mounted display device according to claim 1, wherein
the display controller performs display control such that luminance of an area of a background image in the first and second extended display areas is suppressed more than luminance of an area of another image.

17. The head-mounted display device according to claim 1, wherein
in a case in which display is performed in the first and second extended display areas, the display controller ends the display after elapse of a predetermined time and performs display with same content as the display in the first and second common display areas.

18. A display control method of a head-mounted display device including a first display and a second display that perform image display to be recognized to correspond to left and right eyes, respectively, the first display and the second display having first and second common display areas, respectively, in which image display with common content is performed, the first display and the second display having a first extended display and a second extended display area, respectively, formed by extending the first and second common display areas, respectively, and the first extended display area and the second extended display area being configured to display different images, the method comprising:
generating a signal including common image information for the first and second common display areas and extension image information for the first and second extended display areas as a video signal;
transmitting the signal to the first and second displays; and in a case in which display is performed in the first and second extended display areas, displaying an assistant image indicating that the display is performed in the first and second extended display areas in the first and second common display areas, respectively.

* * * * *